United States Patent [19]

Niki et al.

[11] Patent Number: 5,703,962
[45] Date of Patent: Dec. 30, 1997

[54] IMAGE PROCESSING METHOD AND APPARATUS

[75] Inventors: Toru Niki, Yokohama; Nasami Kugai, Yamato; Tadanori Nakatsuka, Machida, all of Japan

[73] Assignee: Canon Kabushiki Kaisha, Tokyo, Japan

[21] Appl. No.: 934,313

[22] Filed: Aug. 25, 1992

[30] Foreign Application Priority Data

Aug. 29, 1991 [JP] Japan ................................. 3-218571
Oct. 21, 1991 [JP] Japan ................................. 3-272706
Nov. 5, 1991 [JP] Japan ................................. 3-288274

[51] Int. Cl.⁶ .................................................. G06K 9/00
[52] U.S. Cl. .................................................. 382/173
[58] Field of Search .......................... 382/9, 48, 61, 382/173, 282, 317

[56] References Cited

U.S. PATENT DOCUMENTS

| | | | |
|---|---|---|---|
| 4,761,818 | 8/1988 | Bannai | 382/41 |
| 4,933,984 | 6/1990 | Nakano et al. | 382/48 |
| 4,941,195 | 7/1990 | Tanaka et al. | 382/61 |
| 4,958,379 | 9/1990 | Yamaguchi et al. | 382/9 |
| 4,965,678 | 10/1990 | Yamada | 382/48 |
| 5,048,099 | 9/1991 | Lee | 382/9 |
| 5,093,868 | 3/1992 | Tanaka et al. | 382/9 |
| 5,123,062 | 6/1992 | Sangu | 382/9 |

FOREIGN PATENT DOCUMENTS 2513780  4/1983  France.
61-253587  11/1986  Japan.

*Primary Examiner*—Jose L. Couso
*Attorney, Agent, or Firm*—Fitzpatrick, Cella, Harper & Scinto

[57] ABSTRACT

In a character recognition method and apparatus, image information is input, the input image information is displayed, a desired area in the input image information is assigned, the number of characters contained in the assigned area is calculated, and the size of a picture frame for displaying a result of character recognition of the image information is determined according to the calculated number of characters.

9 Claims, 29 Drawing Sheets

FIG. 4

| IMAGE WINDOW | RECOGNITION RESULT WINDOW |
|---|---|
| （1）文書識する文字するイメーの特徴を認合して文字示する認識 | （1）文書画像を入力して、該文書画像の文字を認識する文字認識装置であって、前記文書画像を表示するイメージ表示手段と、切り出した文字パターンの特徴を認識用辞書に格納された標準パターンと照合して文字認識を |

| IMAGE WINDOW | RECOGNITION-RESULT WINDOW |
|---|---|
| パターーンと照結果を表表示手段記文字選部分のイ | （1）文書画像を入力して、該文書画像の文字を認識する文字認識装置であって、前記文書画像を表示するイメージ表示手段と、切り出した文字パターンの特徴を認識用辞書に格納された標準パターンと照合して文字認識を |

FIG. 6

| IMAGE WINDOW | RECOGNITION-RESULT WINDOW |
|---|---|
| 61─▨ターン<br>ーンと照<br>結果を表<br>表示手段<br>記文字選<br>部分のイ | （１）文書画像を入<br>力して、該文書画像<br>の文字を認識する文<br>字認識装置であつて、<br>前記文書画像を表示<br>するイメージ表示手<br>段と、切り出した文<br>字▨ターンの特徴を<br>認識用辞書に格納さ<br>れた標準パターンと<br>照合して文字認識を |

FIG. 7

| IMAGE WINDOW | RECOGNITION-RESULT WINDOW |
|---|---|
| 71─パターン<br>ーンと照<br>結果を表<br>表示手段<br>記文字選<br>部分のイ | （１）文書画像を入<br>力して、該文書画像<br>の文字を認識する文<br>字認識装置であつて、<br>前記文書画像を表示<br>するイメージ表示手<br>段と、切り出した文<br>字▨ターンの特徴を<br>認識用辞書に格納さ<br>れた標準パターンと<br>照合して文字認識を |

FIG. 8

| IMAGE WINDOW | RECOGNITION-RESULT WINDOW |
|---|---|
| パターンと照合結果を表表示手段記文字選部分のイ | （1）文書画像を入力して、該文書画像の文字を認識する文字認識装置であつて、前記文書画像を表示するイメージ表示手段と、切り出した文字パターンの特徴を認識用辞書に格納された標準パターンと照合して文字認識を |

(81 points to the パ character in the image window)

FIG. 9

| IMAGE WINDOW | RECOGNITION-RESULT WINDOW |
|---|---|
| （1）文書識する文字するイメーの特徴を認合して文字示する認識 | （1）文書画像を入力して、該文書画像の文字を認識する文字認識装置であつて、前記文書画像を表示するイメージ表示手段と、切り出した文字パターンの特徴を認識用辞書に格納された標準パターンと照合して文字認識を |

| IMAGE WINDOW | RECOGNITION-RESULT WINDOW |
|---|---|
| （１）文書識する文字するイメーの特徴を認合して文字示する認識 | （１）文書画像を入力して、該文書画像の文字を認識する文字認識装置であつて、前記文書画像を表示するイメージ表示手段と、切り出した文字パターンの特徴を認識用辞書に格納された標準パターンと照合して文字認識を |

| 静電誘導 | 図5(a)のように，軽くて帯電してない導体球を絶縁体の糸でつるし，これに，負に帯電したエボナイト棒や正に帯電したガラス棒を近づけてみよう。導体球は，エボナイト棒やガラス棒に引き付けられる。このように，帯電していない導体が，帯電体に引き付けられる理由を考えよう。 |

負に帯電したエボナイト棒を導体球に近づけると，導体球の中の自由電子は負電気に反発して，エボナイト棒から遠くへ移動する。その結果，導体球には，図(a)のように，正・負の電気が分布するようになる。このとき，導体球の正電気とエボナイト棒の負電気の間に働く引き合う力のほうが，導体球の負電気とエボナイト棒の負電気の間に働く反発力よりも大きいので，導体球はエボナイト棒に引き付けられる。

このように，帯電体を導体などに近づけたとき，物体中の自由電子が移動して，帯電体に近い側には帯電体と異種の電気があらわれ，遠い側には帯電体と同種の電気があらわれる現象を，静電誘導 という。

負に帯電したエボナイト棒を導体球に

$X_{S1}$ $X_{S2}$
$X_{E1}$ $X_{E2}$ 3-73

3-74

負に帯電したエボナイト棒を導体球に近づけると、導体球の中の自由電子は負電気に反発して、エボナイト棒から遠くへ移動する。その結果、導体球には、図（a）のように、正・負の電気が分布す

----- $x = X_S(y)$
------ $x = X_E(y)$
——— $y = X_S(x)$
——— $y = X_E(x)$

IMAGE PROCESSING METHOD AND APPARATUS

BACKGROUND OF THE INVENTION

1. Field of the Invention

This invention relates to an image processing method and apparatus which can output document information obtained by recognizing input image information.

2. Description of the Related Art

Heretofore, in performing editing processing, such as correction or the like, for document information obtained by recognizing input image information, various methods of displaying the image information in addition to the document information have been considered.

Some of such methods will be explained with relation to using an optical character reader (hereinafter abbreviated as an "OCR"). In an OCR, a document is read by an image scanner or the like, and the document image is displayed on a monitor picture surface of a personal computer or the like. An area to be recognized in the document image is assigned by a pointing device, character recognition is performed, and a character string as a result of the recognition is displayed on the monitor picture surface in a font possessed by the personal computer as a text. Subsequently, correction processing is performed since misrecognition is inevitably included in the result of the recognition. It is easier to perform the correction processing while comparing a text picture frame with an image picture frame displayed on the monitor picture surface than by comparing the text picture frame with the original document paper.

FIG. 37 is a diagram illustrating a conventional technique. In FIG. 37, there is shown a monitor picture surface 4-J1 of a personal computer comprising 640×400 dots. A picture frame 4-J2 displays a text or an image. Reference numeral 4-J3 represents a recognized (or misrecognized) character displayed in a font of the personal computer, and is schematically represented by □ in the present example. A bit image 4-J4 represents a character image of the original document image. In the present example, switching between the text picture frame and the image picture frame is performed using a switch, such as a function key or the like. Only a part of the image picture frame is displayed, since it is impossible to display the entire image (comprising about 3400×4800 dots) when an A4-size document is read with a resolution of 400 dpi (dots per inch). In order to display another portion of the image, a scrolling bar (not shown) may be assigned by a pointing device, or a picture-frame scrolling key allocated on a keyboard may be depressed. In the text picture frame, characters as a result of recognition are displayed in a font comprising 16×16 dots to constitute a text, and editing operations, such as insertion, deletion, replacement or the like, can be performed. The text picture frame can be scrolled in the same manner as the image picture frame. The operator corrects misrecognition by comparing the text with the image while switching between the two picture frames. However, this method is inconvenient since it is impossible to simultaneously watch the text and the image. In order to overcome this problem, a method has been considered in which the text and the image can be simultaneously seen by displaying both the text and the image on one picture surface. In this method, however, deviation between the text picture frame and the image picture frame is produced by a scrolling operation during correction processing. Hence, when one picture frame has been scrolled, the other picture frame must also be scrolled, and therefore a troublesome operation is needed in order to provide a correct correspondence between the two picture frames.

In the conventional technique of displaying both the text data and the image data, if characters constituting the original document are small, it is difficult to discriminate respective characters when the image data are displayed.

Moreover, an area where the image data can be displayed is limited, and it is therefore troublesome to display a desired portion of the text data in the limited area. Hence, it is in some cases easier to see the original document.

In another conventional approach, as shown in FIG. 39, one line of each of the text and image picture frames is displayed so that an image on the corresponding line of the text is shown above the text. This approach still has the inconvenience of having to perform a scrolling operation in the lateral direction. Moreover, a text must be corrected while seeing not only the concerned line but also the entire sentence. If, for example, substantially the same character string appears in two or more portions, correction for such portions is inconvenient in this approach.

As explained above, in each of the above-described approaches, in order to display the portion of the original image corresponding to the portion to be corrected in the text, the operator must find out the corresponding portion while performing a scrolling operation. Accordingly, when processing, such as recognition or the like, for the original image is performed, and a correction operation is performed while comparing processed data with the original image, it is desired to reduce a burden on the correction operation by making the operation of comparing the processed data with the original image easier.

An explanation will Now be provided of conventional processing from inputting image information to outputting text data in the case of an OCR with reference to a flowchart shown in FIG. 40.

That is, in step S3-501, an image-bearing original is read from a scanner, and an analog electrical signal is obtained. In step S3-502, the signal is subjected to binary-coding processing to be converted into binary digital data (hereinafter termed an image). In step S3-503, an image-window picture frame for displaying an image on a display provided in the apparatus is opened, and the image is displayed as shown in FIG. 41. Typically, a plurality of window picture frames can be simultaneously displayed on the display. In the cage of FIG. 41, however, an image window 4-101 is displayed on the entire picture surface of the display.

In step S3-504, the operator of the apparatus assigns an area to be recognized (hereinafter termed a recognition area), for example, an area indicated by reference numeral 4-102 in FIG. 41, by a pointing device, such as a mouse or the like, while watching the image displayed on the display. In step S3-505, a result window for displaying a result of recognition of a character image contained in the recognition area is opened. In step S3-506, character segmenting processing for individually taking out characters in the character image within the assigned recognition area is executed. In step S3-507, recognition processing is executed for respective images of the segmented characters. Finally, in step S3-508, the result of recognition is displayed on the result window.

In addition to the above-described general character recognition processing procedure, if a photograph, a drawing, a heading or the like is contained in the input image-bearing original and therefore the recognition area cannot be segmented in the form of a rectangle assigned by the mouse, the operator performs, for example, an operation of erasing an unnecessary portion from the image displayed on the image window 4-101 before the area assignment by the mouse in step S3-504.

For example, if it is desired to perform character recognition for a character image contained in an area indicated by reference numeral 4-103 within the image displayed on the image window 4-101 shown in FIG. 42, assignment of a rectangular area by the mouse will cause a problem, since a heading "electrostatic induction" indicated on an upper left portion of the picture surface is contained in the assigned rectangular area. Accordingly, the operator performs an operation of erasing the portion "electrostatic induction" from the displayed image, and assignment of a rectangular area by the mouse is performed after obtaining an image indicated by reference numeral 4-103 shown in FIG. 43.

In the above-described conventional approach, however, since the result window is displayed based on a predetermined initial-value size, the numbers of characters and lines in the recognition area do not coincide with the size of the result window. As a result, unnecessary portions may be displayed, and it is difficult to see the result of recognition.

Such problems will be specifically explained with reference to result windows 4-104 having various sizes shown in FIGS. 44 through 48, and the results of recognition displayed on such result windows 4-104. The results of recognition shown in FIGS. 44 through 48 are obtained from the character image contained in the recognition area 4-102 assigned from the image displayed on the image window 4-101 shown in FIG. 41. In FIGS. 44 through 48, reference numeral 4-104 represents a result window, and a reference numeral 4-108 represents a mode setting window for setting various kinds of modes necessary for recognition operations.

In the case of FIG. 44, an unnecessary portion is produced, since the size of the result window 4-104 is too large compared with the numbers of characters and lines in the recognition region 4-102. On the other hand, in the case of FIG. 45, it is rather difficult to catch the contents of the sentence, since the size of the result window 4-104 is too small and therefore forced line feed due to the limitation of the window size is added to original line feed. In order to overcome such a problem, a method may be considered in which original line feed is neglected and only line feed adjusted to the window size is inserted, as shown in FIG. 46. In this approach, however, since the position of line feed differs from that of the original sentence, some difficulty still remains in seeing the sentence, causing an obstruction in operations of confirming and correcting the result of recognition.

When it is desired to recognize an area other than a rectangle from an input image-bearing original containing a photograph, a drawing, a heading or the like, an additional operation for deleting an unnecessary portion is needed. Hence, much time is needed for inputting a character image, and there is always a possibility of a mistaken deletion of a necessary portion together with an unnecessary portion.

SUMMARY OF THE INVENTION

The present invention has been made in consideration of the above-described problems in the prior art.

It is an object of the present invention to provide a character recognition method and apparatus which can display a result of recognition in an appropriate size corresponding to the size of a character image contained in a recognition area.

According to the present invention, by displaying both text and image data so as to correspond with each other, and switching a display picture frame so as to display the corresponding portion of the other data in accordance with scrolling of one data or an instruction for a part of one data, it is always possible to see the text and image data so as to correspond with each other without expressly giving instructions to two kinds of picture frames for the text and image data.

According to the present invention, by displaying text and image data so that the both data are displayed so as to correspond with each other in units of a character, correspondence between the text and the data can be more easily grasped.

According to the present invention, by providing means for instructing magnification/reduction of display of image data, the image data can be displayed in a desired size in accordance with the size of the original and the object of an operation.

As described above in detail, according to the present invention, it becomes possible to convert image data into processed data, display the image data and the processed data simultaneously or by switching between the two bodies of data, and control the positions of the processed data and the image data so that the position of the corresponding image data is discriminately displayed on a display picture surface when an arbitrary position of the processed data is assigned.

According to the present invention, since a window for displaying the result of character recognition is opened after determining its size in accordance with the number of characters contained within a region to be subjected to character recognition, it is always possible to obtain a window having an appropriate size for the result of character recognition. Accordingly, the size of the window does not become so large as to produce an unnecessary portion on the picture frame nor so small as to cause difficulty in seeing the result of character recognition. Hence, the result of recognition can be easily confirmed and corrected.

Furthermore, since the operator can assign an area to be subjected to character recognition in a desired polygonal shape, even an area having a shape for which a plurality of assigning operations of rectangles must be performed can be assigned at a time. Hence, operational efficiency increases.

BRIEF DESCRIPTION OF THE DRAWINGS

FIG. 4 is a second diagram showing the display unit of the character recognition apparatus of the first embodiment;

FIG. 5 is a third diagram showing the display unit of the character recognition apparatus of the first embodiment;

FIG. 6 is a fourth diagram showing the display unit of the character recognition apparatus of the first embodiment;

FIG. 7 is a fifth diagram showing the display unit of the character recognition apparatus of the first embodiment;

FIG. 8 is a sixth diagram showing the display unit of the character recognition apparatus of the first embodiment;

FIG. 9 is a seventh diagram showing the display unit of the character recognition apparatus of the first embodiment;

FIG. 28 is a first diagram illustrating assignment of a recognition area;

FIG. 29 is a second diagram illustrating assignment of a recognition area;

FIG. 30 is a third diagram illustrating assignment of a recognition area;

DESCRIPTION OF THE PREFERRED EMBODIMENTS

First Embodiment

Figure 1:
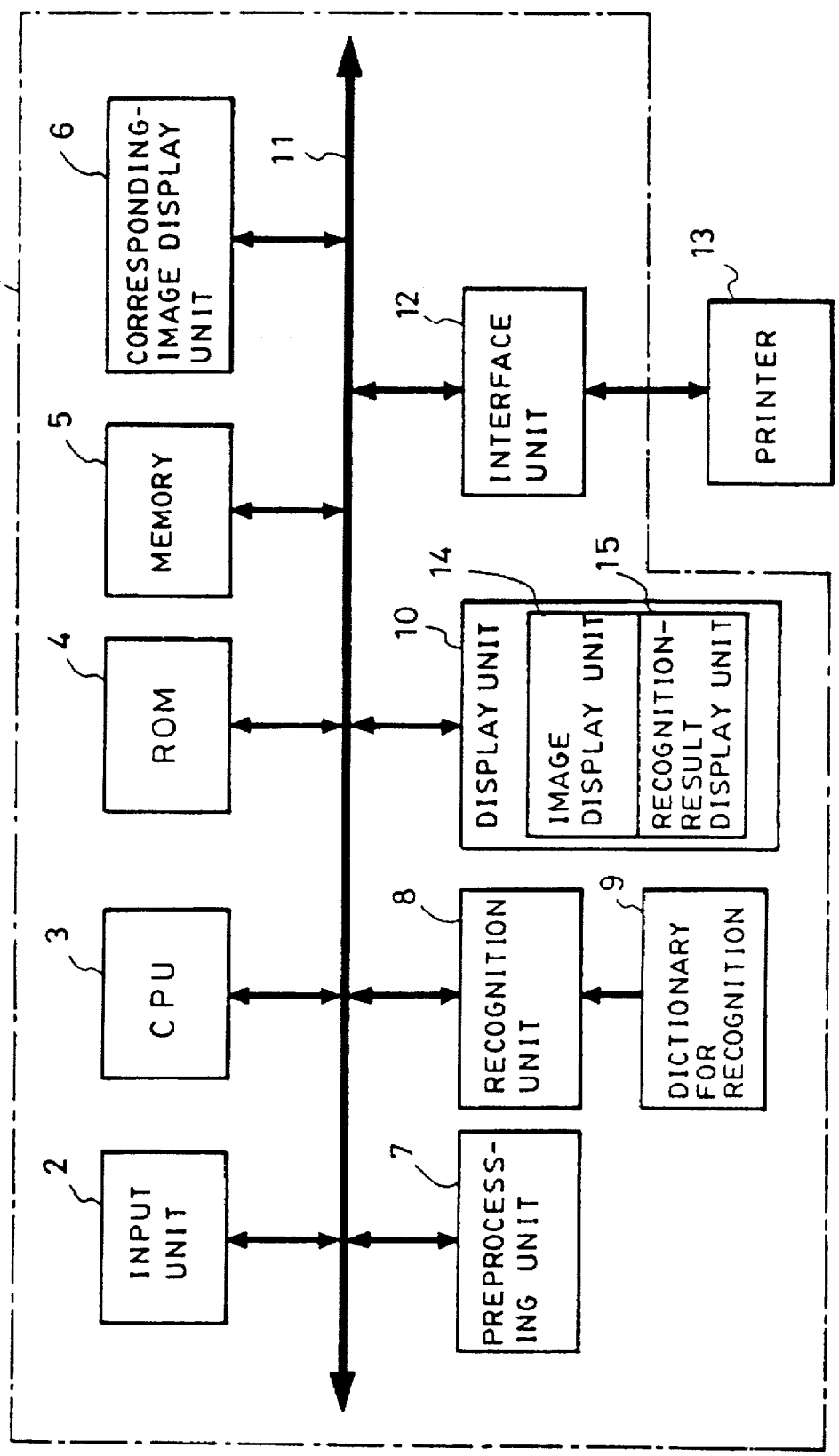
FIG. 1 is a block diagram showing the schematic configuration of a character recognition apparatus according to a first embodiment of the present invention.

Explanation of Character Recognition Apparatus (FIG. 1)

FIG. 1 is a block diagram showing the schematic configuration of a character recognition apparatus according to a first embodiment of the present invention. In FIG. 1, there is shown a character recognition apparatus 1 of the first embodiment. An input unit 2 reads and inputs a document image, comprising a scanner or the like, and inputs original image data as, for example, binary digital data. A central processing unit (hereinafter termed a CPU) 3 for calculation processing controls the entire apparatus 1. A ROM (read-only memory) 4 stores control programs of processing of flowcharts shown in figures after FIG. 13 and various kinds of data to be executed by the CPU 3. A RAM (random access memory) 5 is used as work areas for the CPU 3, and also includes an area for storing document image data input from the input unit 2, and an area for storing the positions and sizes of character patterns segmented from the input document image data by a preprocessing unit 7. A corresponding-image display unit 8 rewrites an image displayed on an image display unit 14 in accordance, with the position and size of a character pattern corresponding to a character selected by a recognition-result display unit The preprocessing unit 7 segments the pattern of a single character in the document image stored in the RAM 5, and executes various kinds of normalizing operations. A recognition unit 8 extracts geometrical characteristics from the pattern preprocessed by the preprocessing unit 7, and performs character recognition of the document image by collating the extracted characteristics with a standard pattern stored in a dictionary 9 for recognition. A display unit 10 comprises an image display unit 14 for displaying an input document image, and a recognition-result display unit 15, and controls the display of the apparatus. The result of recognition can be corrected by the control of the recognition-result display unit 15 while watching the display. A system bus 11 includes a data bus from the CPU 3, an address bus, a control-signal bus and the like. An interface unit 12 controls interface with an external output device, such as a printer 13 or the like.

Figure 2:
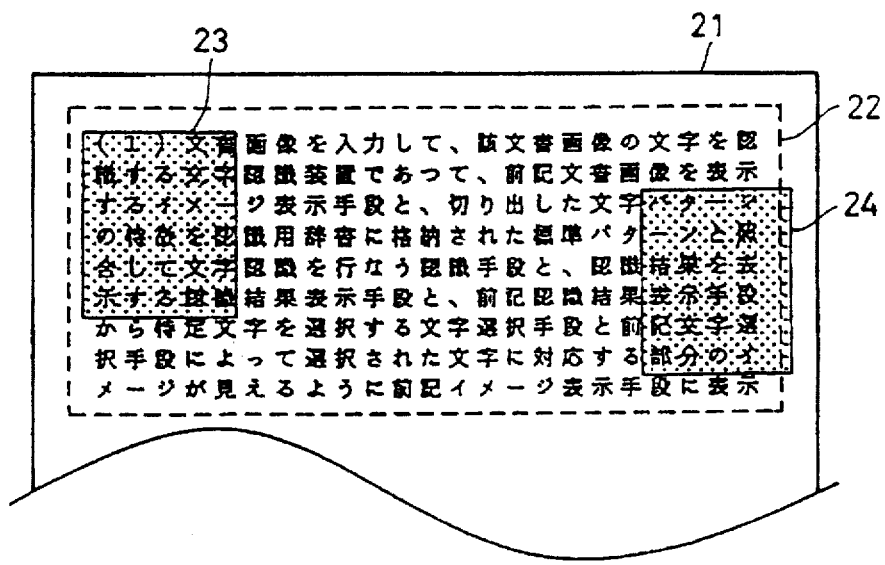
FIG. 2 is a diagram showing a document original to be read by the character recognition apparatus of the first embodiment.

Explanation of Document Image (FIG. 2)

FIG. 2 shows an example of the document image input to the character recognition apparatus 1 of the present embodiment. In FIG. 2, there is shown a document image 21 to be read by the input unit 2. The user instructs recognition for a portion 22 within the document image 21. Reference numeral 23 represents a portion displayed on an image window shown in FIG. 3. Reference numeral 24 represents a portion displayed on an image window shown in FIG. 5.

Explanation of Image Window and Recognition-result Window (FIGS. 3–12)

Each of FIGS. 3 through 12 shows an image window and a recognition-result window displayed on the picture surface of a personal computer or the like. The image window and the recognition-result window are displayed by the control of the image display unit 14 and the recongition-result display unit 15, respectively.

Figure 3:
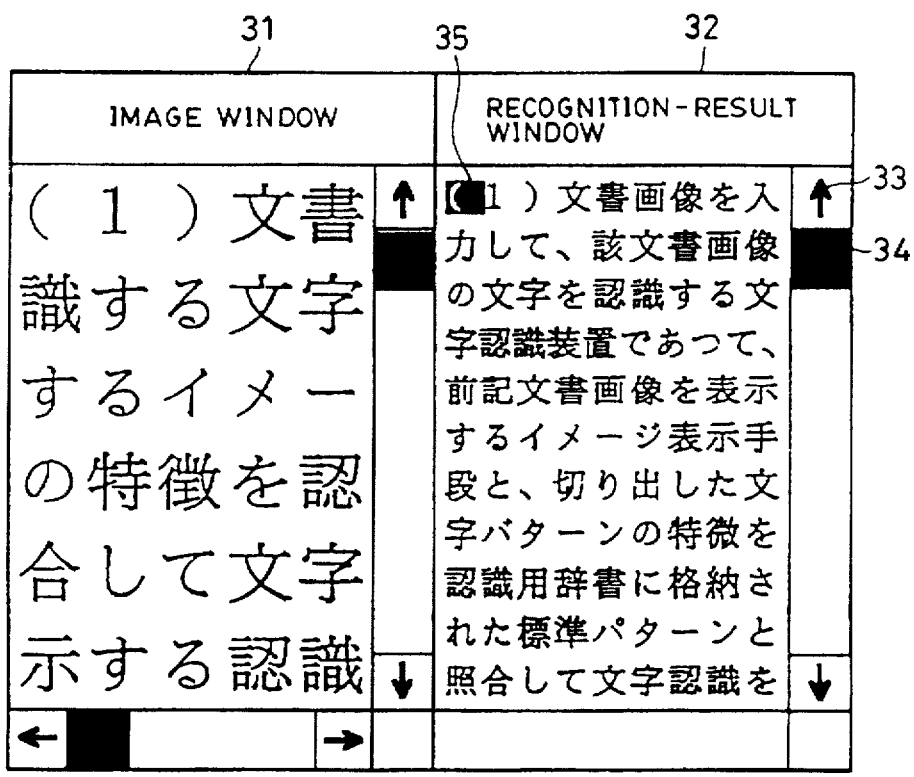
FIG. 3 is a first diagram showing a display unit of the character recognition apparatus of the first embodiment.

FIG. 3 shows an image window and a recognition-result window after executing recognition. In FIG. 3, there are shown an image window 31, a recognition-result window 32, each button 33 for scrolling the portion displayed on the corresponding window, and each button 34 for indicating an approximate position of the portion displayed on the corresponding window with respect to the entire image. Reference numeral 35 represents a character selected by a character selection means. The character is selected by the movement of a cursor and the instruction of character selection by the character selection means.

FIG. 4 is a diagram indicating that a character "ハ'" is selected by the character selection means. Reference numeral 41 represents the character selected by the character selection means.

FIG. 5 is a diagram showing that the image window is rewritten by the corresponding-image display unit 6 so that the image of the portion corresponding to the character "ハ'" can be seen after the character "ハ'" has been selected by the character selection means.

FIGS. 6–8 are diagrams showing that the image window is rewritten by the corresponding-image display unit 6 so that the image of a portion corresponding to the character " " can be seen after the character "ハ'" has been selected by the character selection means, and the portion corresponding to the character "ハ'" is displayed. Reference numerals 61, 71 and 81 represent the portion corresponding to the character "ハ'" displayed in screen, in a frame, and in reversal, respectively.

FIG. 9 shows the image window and the recognition result window after executing recognition.

Figures 10, 11:
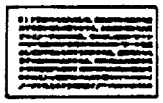
FIG. 10 is an eighth diagram showing the display unit of the character recognition apparatus of the first embodiment.
FIG. 11 is a ninth diagram showing the display unit of the character recognition apparatus of the first embodiment.

FIG. 10 is a diagram showing that after selecting a character "執" 101 by the character selection means, only a portion 102 corresponding to the character "執" is displayed in reversal without rewriting the image, since the image containing the portion corresponding to the character "執" is already displayed.

FIG. 11 shows the image window and the recognition-result window after recognition. In the image window, the document image is displayed in a reduced size so that the entire image can be seen.

Figures 12, 13:
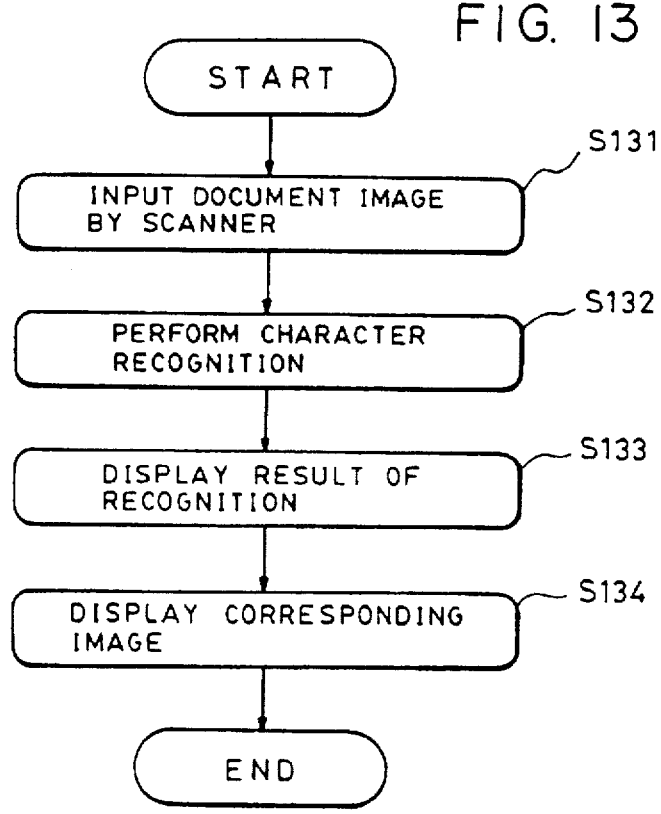
FIG. 12 is a tenth diagram showing the display unit of the character recognition apparatus of the first embodiment.
FIG. 13 is a flowchart showing processing in the character recognition apparatus of the first embodiment.

FIG. 12 is a diagram showing that after selecting the character "執" by the character selection means, the image window is displayed in a magnified size so that the portion corresponding to the character "執" can be easily seen.

Explanation of the First Embodiment (FIGS. 3, 4, 5, 13 and 14)

FIG. 13 is a flowchart illustrating the operation of the CPU 3 in the first embodiment. The control program for executing this processing is stored in the ROM 4.

First, in step S131, the document image 21 set by the operator is read and input by the input unit (scanner) 2, and is stored in the memory 5. The process then proceeds to step S132, where preprocessing is performed by the preprocessing unit 7, and character recognition is performed by the recognition unit 8. The results (the position and the size of the character, the result of the recognition) of these operations are stored in the memory 5. The process then proceeds to step S133, where the result of the recognition is displayed by the image display unit 14 of the display unit 10. The result of the recognition is displayed on the recognition-result window 32. The document image 21 is displayed on the image window 31 so that the upper left portion of the recognized portion 22 can be seen (default). The process then proceeds to step S134, where the document image 21 is redisplayed by the corresponding-image display unit 6 so that the image portion corresponding to the character 41 selected by the character selection means can be seen. This corresponds to the image displayed on the image window shown in FIG. 5.

Figure 14:
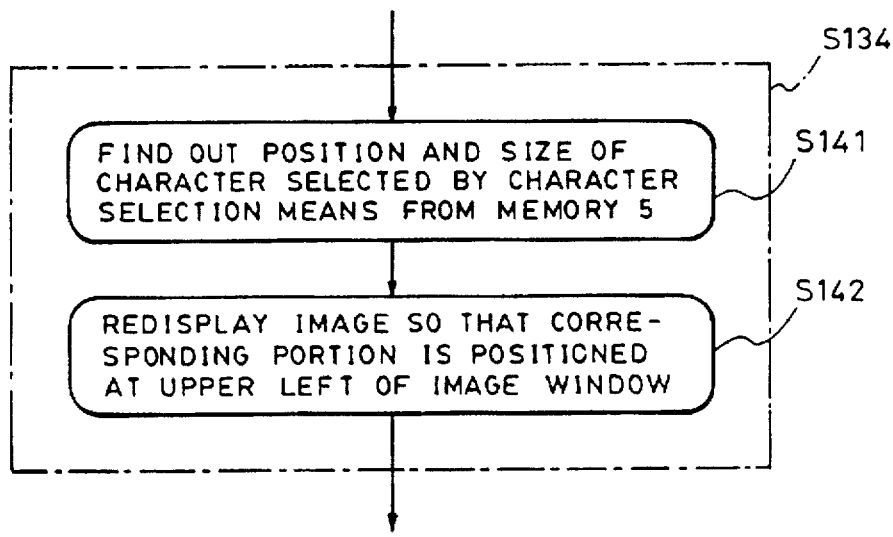
FIG. 14 is a flowchart showing second processing in step 134 in the flowchart shown in FIG.

FIG. 14 is a flowchart showing the processing of displaying the corresponding image in step S134 shown in FIG. 13.

First, in step S141, the position and the size of the character 41 selected by the character selection means are found out from the memory 5. Subsequently, in step S142, the image is redisplayed so that the corresponding portion is positioned at the upper left portion of the image window (see FIG. 5).

The explanation of processing of outputting characters and the like from the printer 13 will be omitted.

As can be understood from the foregoing explanation, in the first embodiment, it is possible to provide a character recognition apparatus which is easy to use for the user, since an original image of a portion to be corrected by the user can be automatically displayed.

Figure 15:
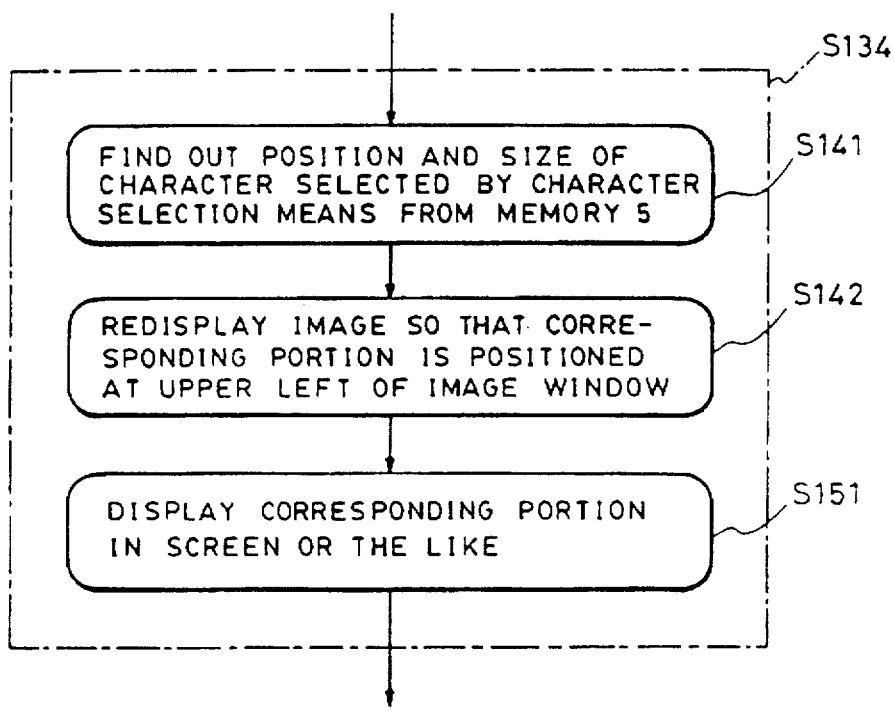
FIG. 15 is a flowchart showing third processing in step 134 in the flowchart shown in FIG. 13.

FIG. 15 is a flowchart showing processing when the corresponding image is displayed in step S134 shown in FIG. 13. In FIG. 15, after steps S141 and S142 shown in FIG. 14, in step S151, the corresponding portion is displayed in screen 61, as shown in FIG. 6. That is, in addition to the above-described processing, the image portion of the character selected by the character selection means is clearly shown.

Although in FIG. 6, the image portion of the selected character is displayed in screen, the same effect may be obtained by displaying the image portion in the character frame 71, or in reversal 81, as shown in FIGS. 7 and 8, respectively.

Figure 16:
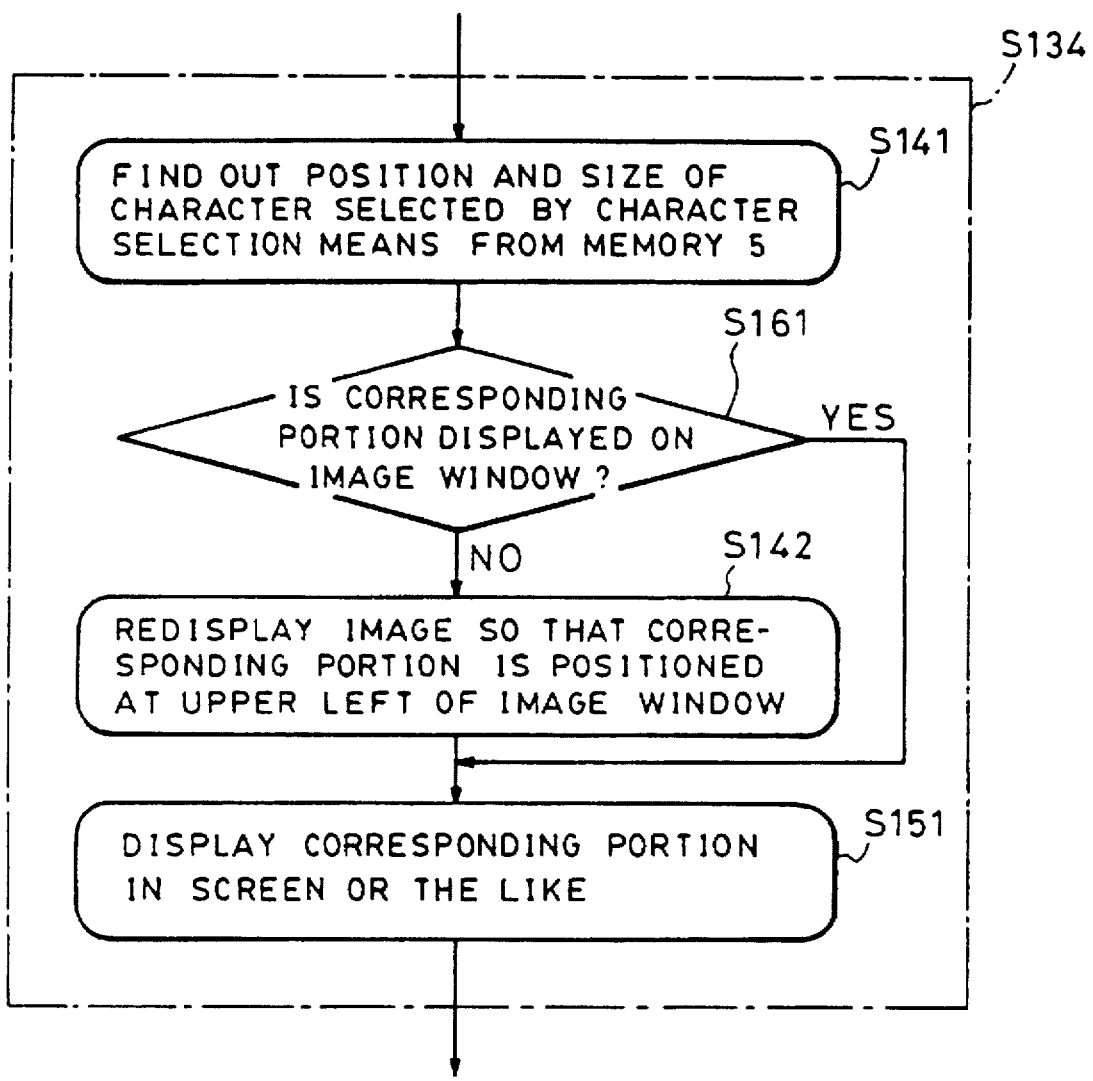
FIG. 16 is a flowchart showing fourth processing in step 134 in the flowchart shown in FIG. 13.

In the flowchart of FIG. 16, determination (step S161) whether the corresponding portion is already displayed on the image window is inserted between steps S141 and S142 shown in the flowchart of FIG. 14. If the corresponding portion is displayed as shown in FIG. 9 and is therefore determined to be already displayed on the image window in step S161, only reversal display of the corresponding portion is performed in step S151 (see FIG. 10). If the result of determination in step S161 is negative, the image is redisplayed so that the corresponding portion is positioned at the upper left of the image window in step S142, in the same manner as in the flowchart of FIG. 15. Subsequently, in step S151, the corresponding portion is displayed in screen.

Figure 17:
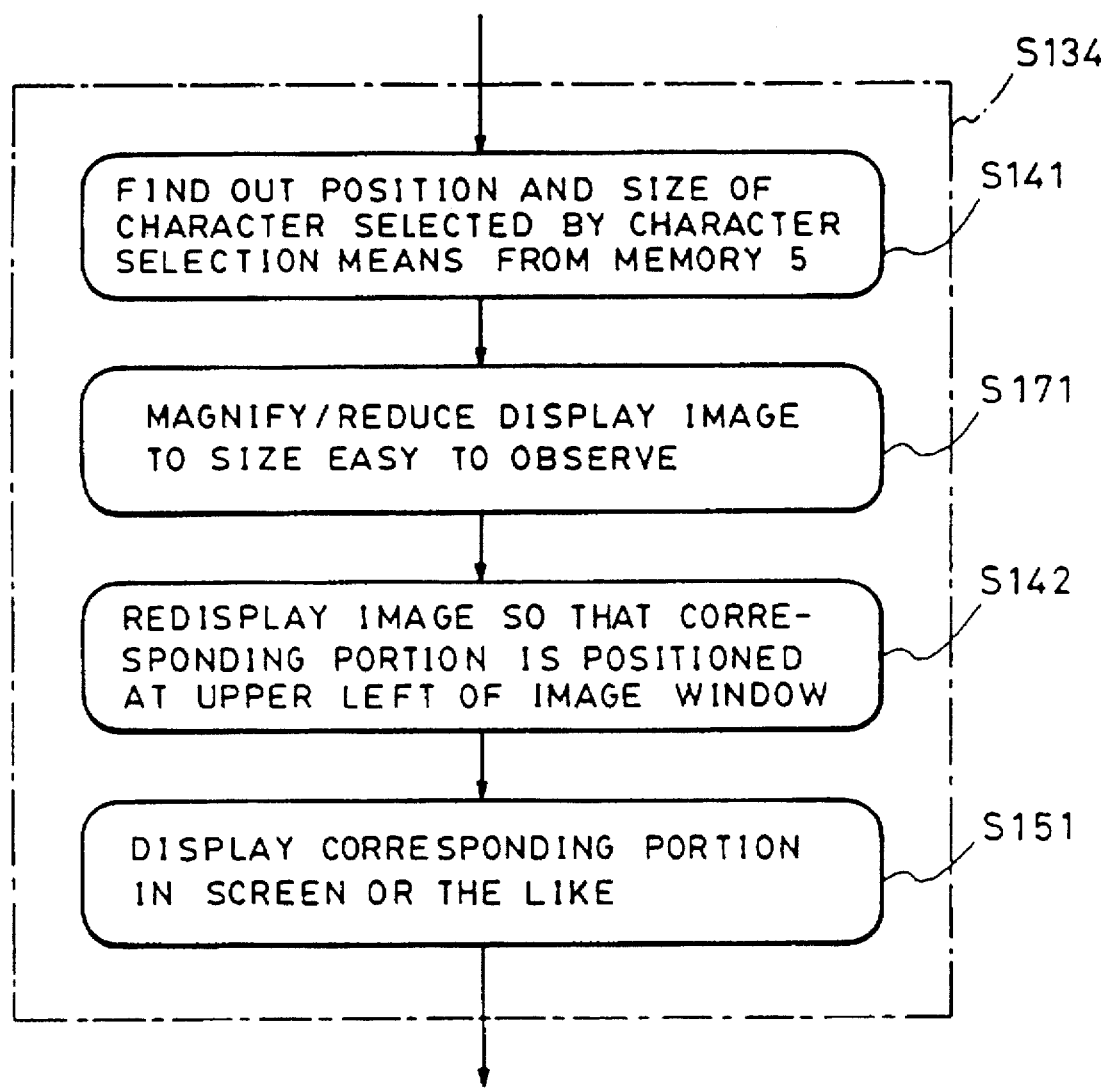
FIG. 17 is a flowchart showing fifth processing in step 134 in the flowchart shown in FIG. 13.

In the flowchart of FIG. 17, magnification/reduction of the displayed image (step S171) to a size easy to see is performed between steps S141 and S142 shown in the flowchart of FIG. 14.

First, in step S141, the position and the size of the character selected by the character selection means are found out from the memory 5. In step S171, the displayed image is magnified or reduced to a size easy to see. The instruction of magnification/reduction is performed through a keyboard or a mouse. This operation is performed because usually, after reading an image by the input unit 2, the entire document image is in many cases displayed in a reduced size and an area to be recognized is assigned, and therefore the image is too small to see if the corresponding portion is displayed on the image window. Subsequently, in step S142, the image is redisplayed so that the corresponding portion is positioned at the upper left of the image window. In step S151, the corresponding portion is displayed in reversal.

As explained above, according to the present embodiment, it becomes possible to automatically display the original image of the portion to be corrected by the user. As a result, when a document original is read, recognized and corrected, the user need not perform correction by directly referring to the original document or by finding out the corresponding portion in the original image. Hence, the apparatus of the embodiment is easy to use, and the operability in character recognition is improved.

Means for setting various kinds of functions explained with reference to FIGS. 6–12 to initial states as defaults and instructing switching between the functions may, of course, be provided so that desired processing can be performed according to the instruction.

Second Embodiment

Figure 18:
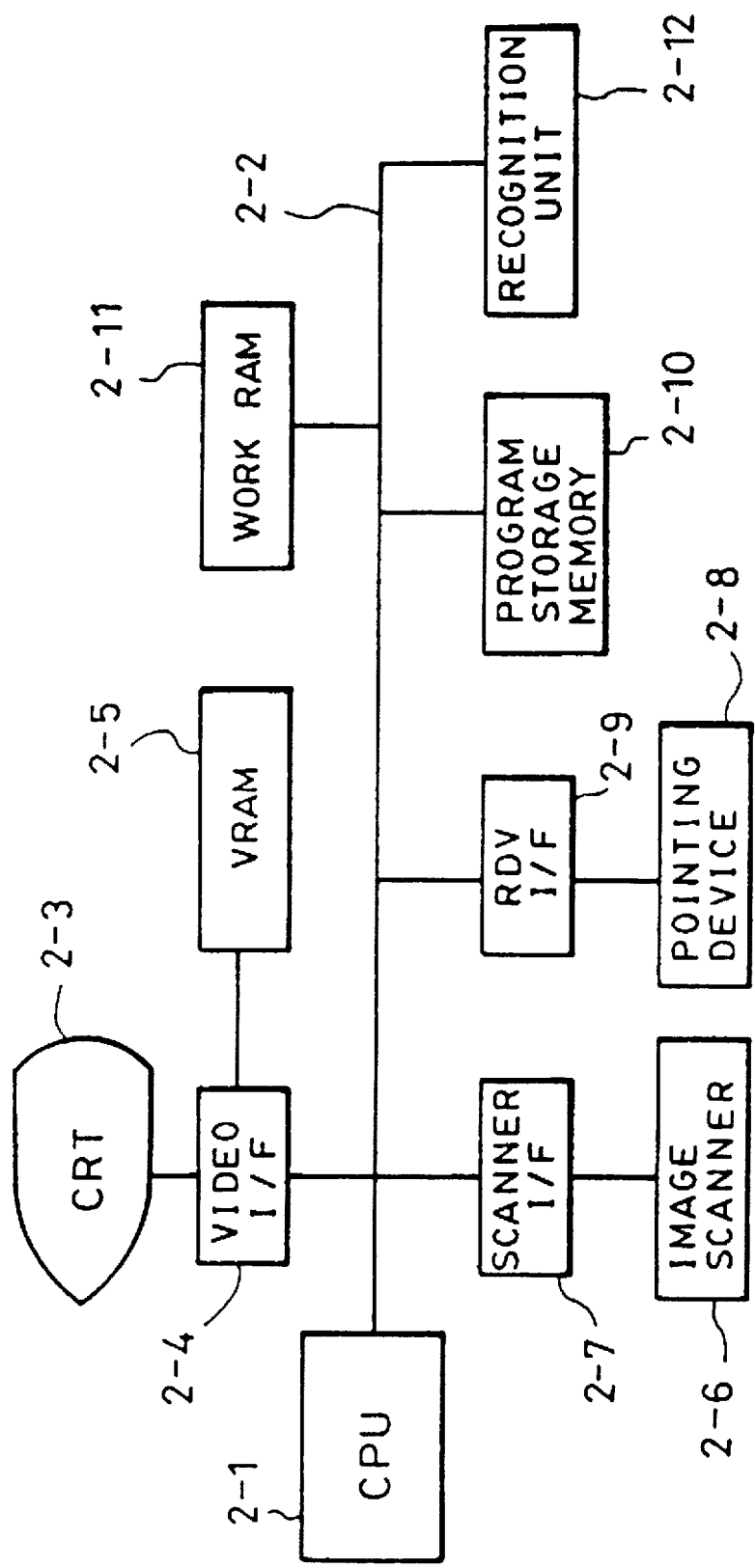
FIG. 18 is a block diagram showing the schematic configuration of a character recognition apparatus according to a second embodiment of the present invention.

FIG. 18 is a block diagram showing the configuration of a character recognition apparatus according to a second embodiment of the present invention. In FIG. 18, there are shown a CPU 2-1 for executing processing procedures of the present embodiment, a bus 2-2, a CRT (cathode-ray tube) 2-3 for displaying texts and images, a video interface 2-4 between the CPU 2-1 and the CRT 2-3, a VRAM 2-5 for storing texts and images to be displayed on the CRT 2-3, an image scanner 2-6 for inputting images, a scanner interface 2-7, a pointing device 2-8 for assigning coordinates on the CRT 2-3, an interface 2-9 for the pointing device 2-8, a program memory 2-10 for storing processing procedures of the CPU 2-1, a work RAM 2-11 for storing operational areas, document images and the like for the processing procedures, and a recognition unit 2-12 for recognizing characters.

Figure 19:
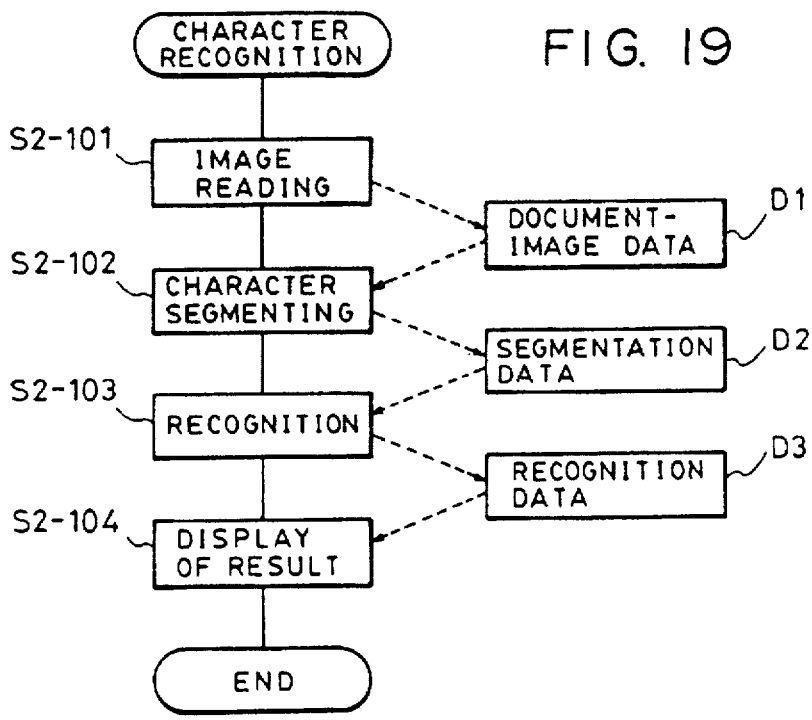
FIG. 19 is a first flowchart showing processing in the second embodiment.
Figure 20:
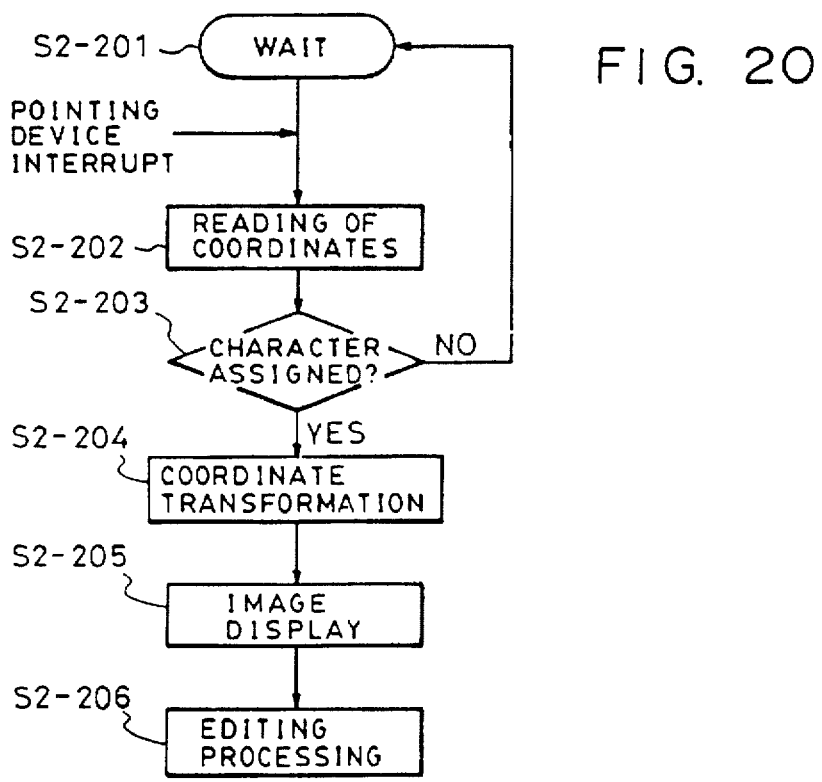
FIG. 20 is a second flowchart showing processing in the second embodiment.

FIG. 19 is a flowchart showing processes of character recognition. FIG. 20 is a flowchart showing processes of ganged movement of images. These processing procedures are stored in the program memory 2-10, and are executed by the CPU 2-1. The processes will now be explained in the sequence thereof.

In step S2-101, the document is read by the image scanner 2-6, and binary-coded document image data (an image) D1 are stored in the work RAM 2-11. In step S2-102, segmenting of characters is performed by processing the document image data D1. That is, projection in the lateral direction (the x-axis direction) is first performed, and segmenting of character lines is performed by dividing the projected images at spacings between the images. Subsequently, projection in the vertical direction (the y-axis direction) is performed for each line, and segmenting of characters is performed by dividing the projected images at spacings between the images. Thus, the image of each character can be segmented with its circumscribed rectangle, whereby the divided images of individual characters can be obtained. The coordinates of the upper left point of the circumscribed rectangle of each character (the x-y coordinates when the upper left portion of the original document image is made to be the origin, termed a character position) can also be obtained. The segmented character image and the position of the character are stored in the work RAM 11 as segmentation data D2.

Figure 22:
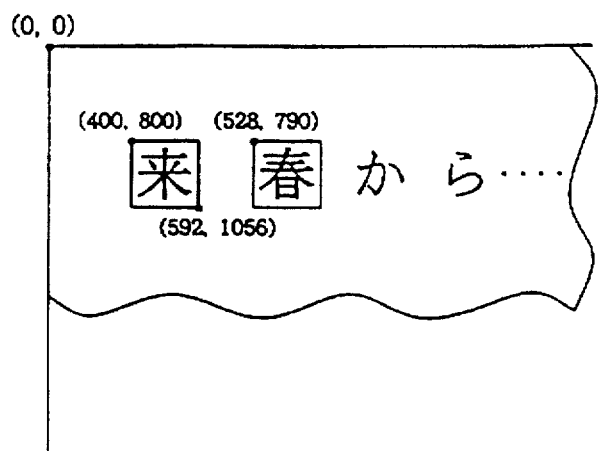
FIG. 22 is a diagram illustrating a relationship between character images and character positions.

FIG. 22 is a diagram schematically showing the relationship between the above-described segmented character image and the position of the character. As is apparent from FIG. 22, the position of the character is represented by (400, 800) as data in units of a dot making the upper left portion of the original document image to be the origin. This data represents the output position of a dot, and may be represented, for example, in 1/128 of the above-described value, provided that a correspondence is present between the represented value and the actual position. Thus, the position of the character and the character image are stored in the work RAM 2-11 as the segmentation data D2. As will be described later, the segmentation data D2 and recognition data D3 are stored in the work RAM 2-11 so as to correspond to each other.

Figure 21:
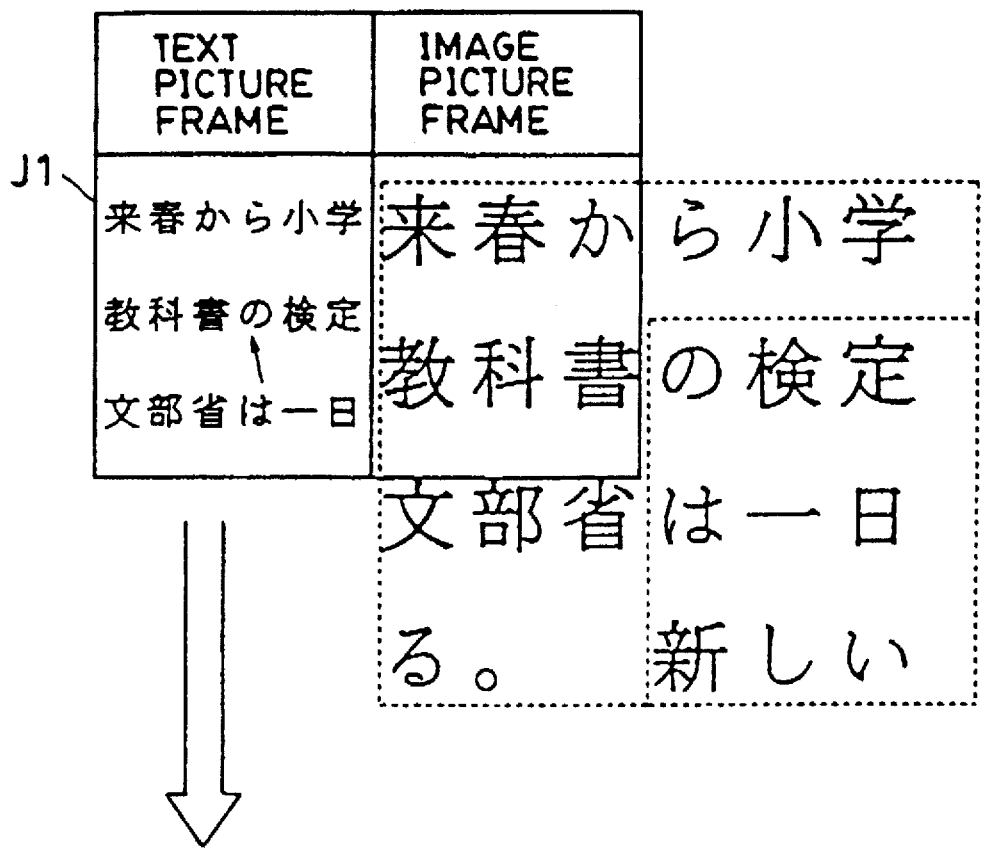
FIG. 21 is a diagram showing an example of display in the second embodiment.

Subsequently, in step S2-103, the character image is transmitted to the recognition unit 2-12, which recognizes what character the transmitted image represents, and stores a character code as a result of the recognition in the work RAM 2-11 as recognition data D3. A known method, such as a directional-index histogram method or the like, is used as the algorithm for recognition. However, the choice of algorithm is not limited to such a method. At that time, one-to-one correspondence between the segmentation data D2 and the recognition data D3 is provided for each character. Subsequently, in step S2-104, the recognition data is displayed on the text picture frame of the CRT 2-3, as shown in FIG. 21. In this case also, the position of the character displayed on the text picture frame is made to correspond to the address of the corresponding recognition data. By combining this correspondence with the above-described correspondence, the position of the character on the text picture frame can correspond to the the position of the character in the original image (coordinates conversion means). As shown in FIG. 21, the picture surface of the CRT 2-3 is divided into the left half portion and the right half portion as the text picture frame and the image picture frame, respectively. The document image is displayed on the image picture frame so that the upper left portion of the document is positioned at the upper left portion of the image when the image has been read.

After the completion of step S104, the apparatus is in a WAIT state (step S2-201, where an input of coordinates is awaited. Suppose that the character "の" in the text picture frame shown in FIG. 21 is assigned by the pointing device 2-8. At that time, pointing device interrupt is generated to terminate the WAIT state. The process then proceeds to step S2-202, where the assigned coordinates are read. If the coordinates have not assigned a character (the determination in step S2-203), the process returns to step S2-201 to resume a WAIT state. If the coordinates have assigned a character, the process proceeds to step S2-204. In step S2-204, to which recognition data D3 the assigned character corresponds is determined while searching the data D3 in the upstream direction. To which segmentation data D2 the assigned character corresponds is also determined. Since the coordinates (the position) of the character in the original image are stored in the segmentation data D2, the coordinates of the origin for image display are set to the stored position of the character. In step S2-205, the image is redisplayed based on the new coordinates of the origin for image display.

Thus, as shown in FIG. 21, a state in which the original image corresponding to the character "の" in the text picture frame is not displayed is replaced by a state in which the original image containing the character "の" is situated at the upper left of the image picture frame.

The process then proceeds to step S2-206, where editing processing, such as insertion, deletion, replacement or the like, is performed for the assigned character on the text picture frame.

In accordance with the editing processing for the character on the text picture frame, processing, such as movement or the like, may be performed for the corresponding image picture frame as an image-data block, and processing, such as insertion or the like, may be performed using the character-pattern image on the text picture frame.

The present invention may, of course, be achieved in an apparatus or a system, or by supplying a program to the apparatus or the system.

Although an explanation has been provided of a case in which, when a character is assigned, the portion corresponding to the character in the image of the original is redisplayed so as to be positioned at the upper left of the image picture frame, the corresponding portion is not limited to be positioned at the upper left of the picture frame, but may be positioned at the center of the picture frame, or at any other arbitrary position.

Although in the present embodiment, a laterally-written document has been illustrated, the same effect may, of course, be obtained for a vertically-written document.

Processing data formed from the original image is not limited to character recognition, but may be any data which can correspond to the image.

As described above, (1) according to the present invention, a correction operation by comparing the text image with the original image can be efficiently performed.

(2) The entire original image may not necessarily be displayed on the monitor picture surface, but only part of the image may be displayed. An inexpensive monitoring device may be used, whereby the capacity of the memory can be reduced.

(3) Since comparison of the processed image (the text) with the original image can be performed with magnifying the original image in a state of being easily seen, the original image can be exactly grasped.

Third Embodiment

Figure 23:
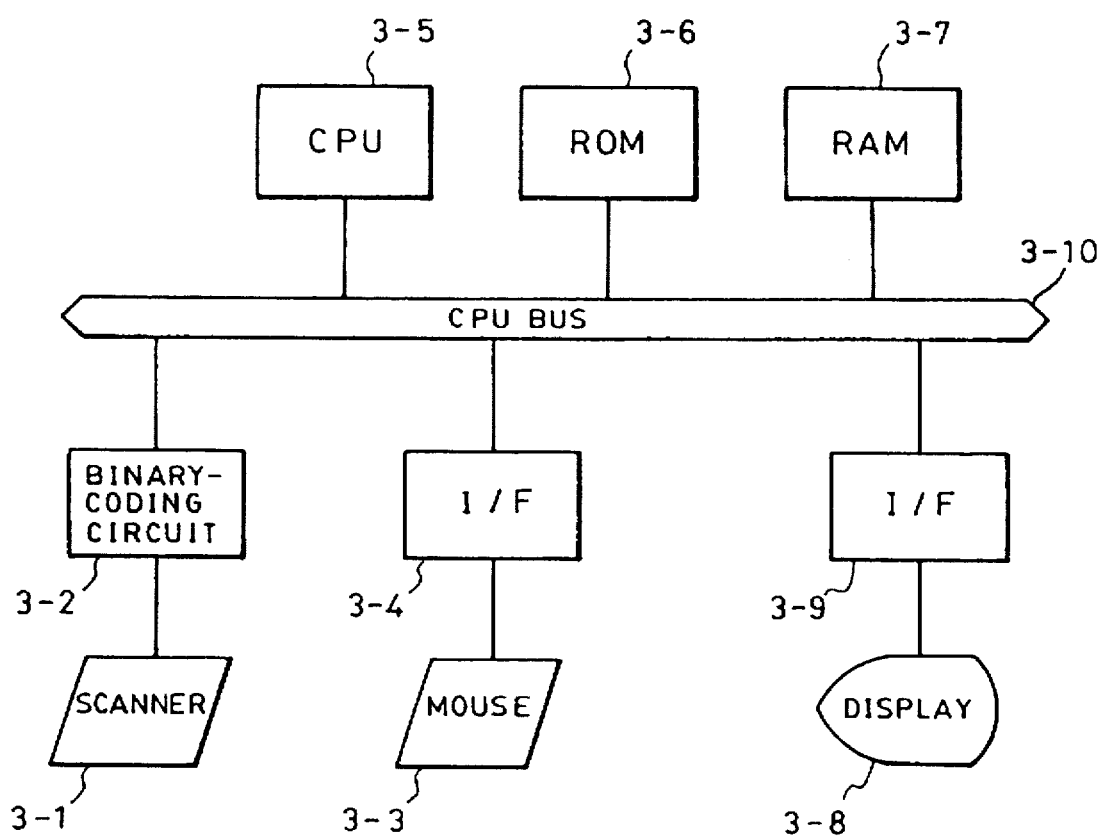
FIG. 23 is a block diagram showing the schematic configuration of a character recognition apparatus according to a third embodiment of the present invention.

FIG. 23 is a block diagram showing the configuration of an optical character reader (OCR) according to a third embodiment of the present invention. In FIG. 23, a scanner 3-1 projects light onto an image-bearing original, read light reflected by the original, and outputs an analog electrical signal. A binary-coding circuit 3-2 performs digital conversion of the electrical signal output from the scanner 3-1 into a binary signal corresponding to the black-and-white image of the original. A mouse 3-3 functions as a pointing device for inputting coordinates for, for example, area assignment on an image window. A mouse interface circuit 3-4 transmits the signal from the mouse 3-3 to other components consituting the apparatus. A CPU 3-5 controls the entire apparatus and executes character segmenting processing, recognition processing and the like. A ROM 3-6 stores control programs and various kinds of processing programs to be executed by the CPU 3-5, a dictionary for recognition and the like. A RAM 3-7 is used, for example, as work areas for the development of character images and character recognition processing. A display 3-8 displays input images and recognition results. There are also shown a display interface circuit 3-9, and a CPU bus 3-10 for connecting respective components of the apparatus.

Area Assignment by a Single Rectangle

Figure 24:
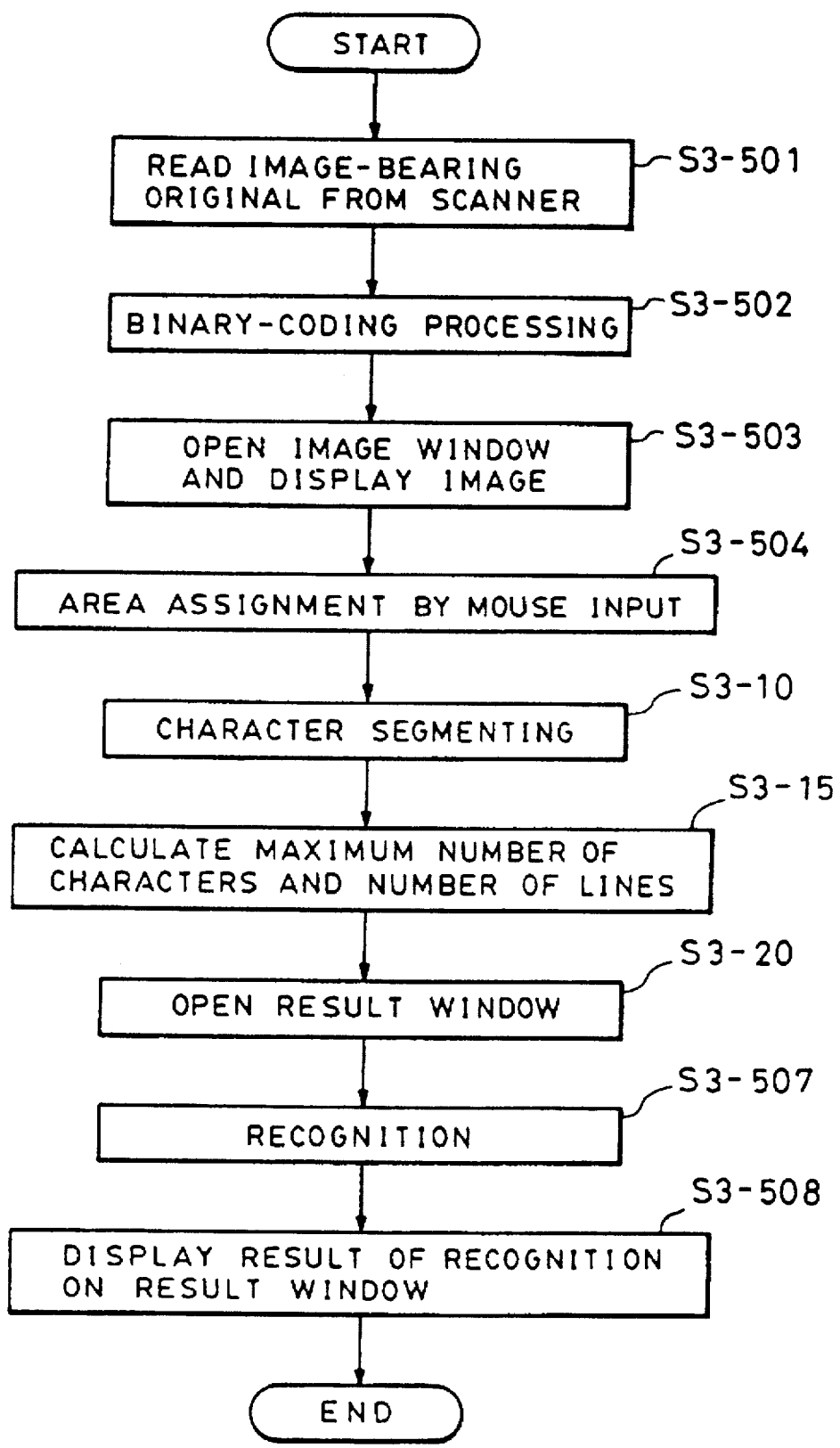
FIG. 24 is a flowchart of processing for assigning an area by a single rectangle in the second embodiment.
Figure 40:
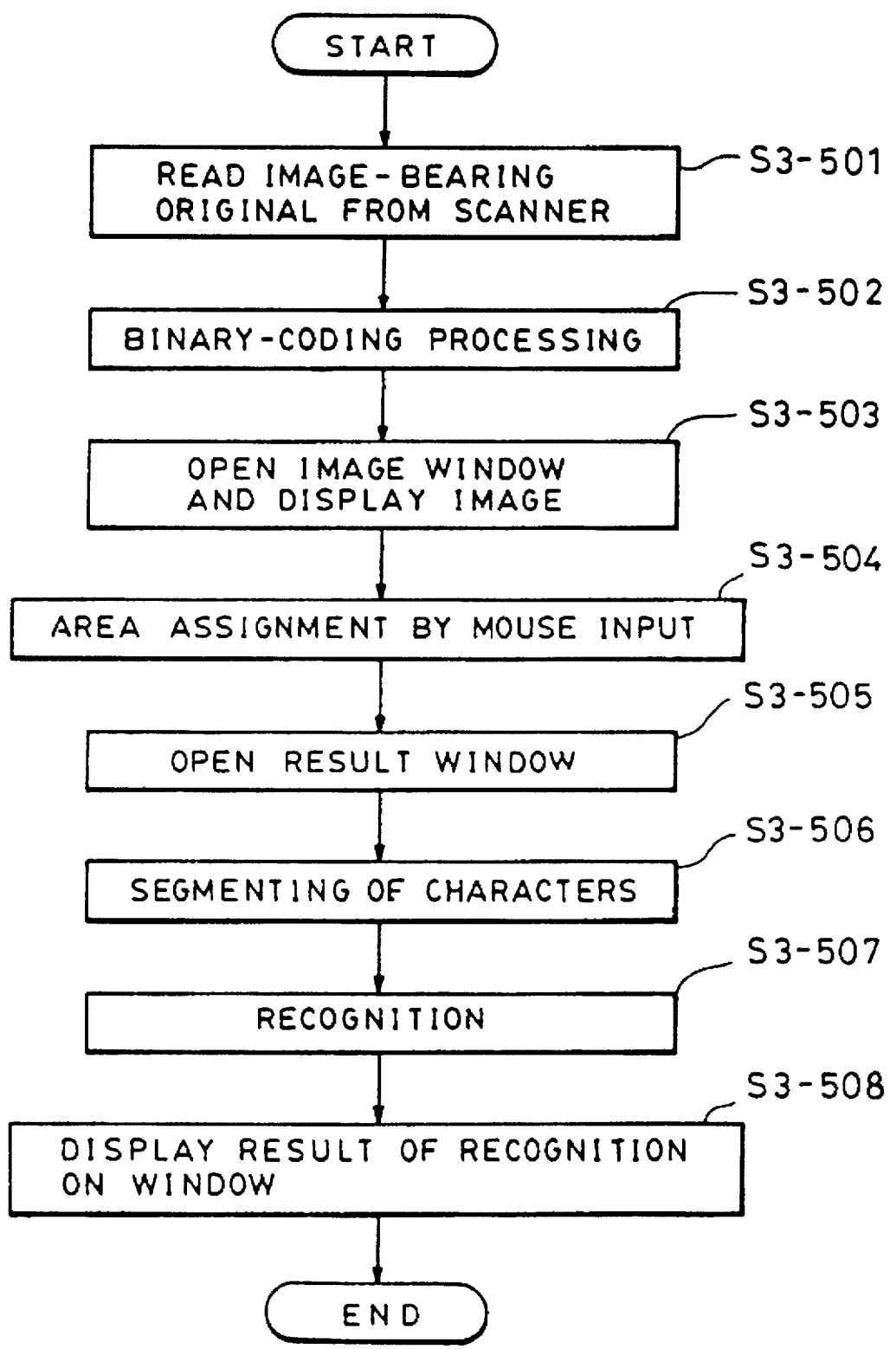
FIG. 40 is a flowchart illustrating a conventional approach in the third embodiment.

An explanation will now be provided of character recognition processing executed using the character recognition apparatus having the above-described configuration with reference to the flowchart shown in FIG. 24. The same processing steps as those already explained in the conventional approach with reference to FIG. 40 are indicated by the same step reference numerals, and an explanation thereof will be omitted.

In steps S3-501–S3-504, input of an image-bearing original, binary-coding processing, image display, and assignment of a recognition area by the mouse are performed according to the conventional technique.

Subsequently, in step S3-10, character segmenting processing is performed from the assigned recognition area, and rectangular areas corresponding to respective characters are taken out. In step S3-15, the maximum number of characters and the number of lines in the recognition area are calculated according to the result of the character segmenting processing. The size of the result window necessary for displaying characters as the result of recognition and not having unnecessary space is determined from the above-described values. In step S3-20, the result window having the determined size is opened.

In steps S3-507–S3-508, recognition processing is performed according to the conventional technique, and the result of the recognition is displayed on the result window.

Figure 25:
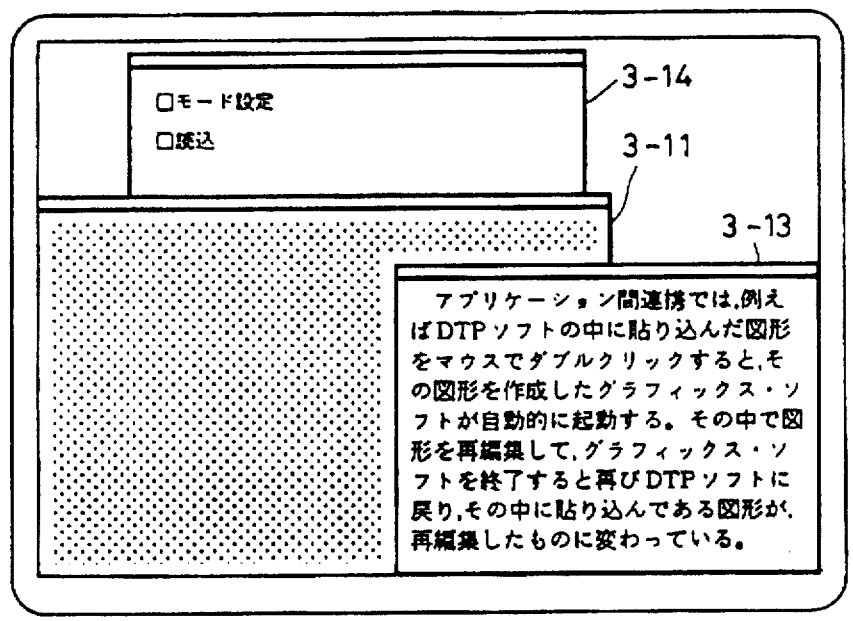
FIG. 25 is a diagram illustrating an example of display in a result window in accordance with the processing shown in FIG. 24.
Figure 41:
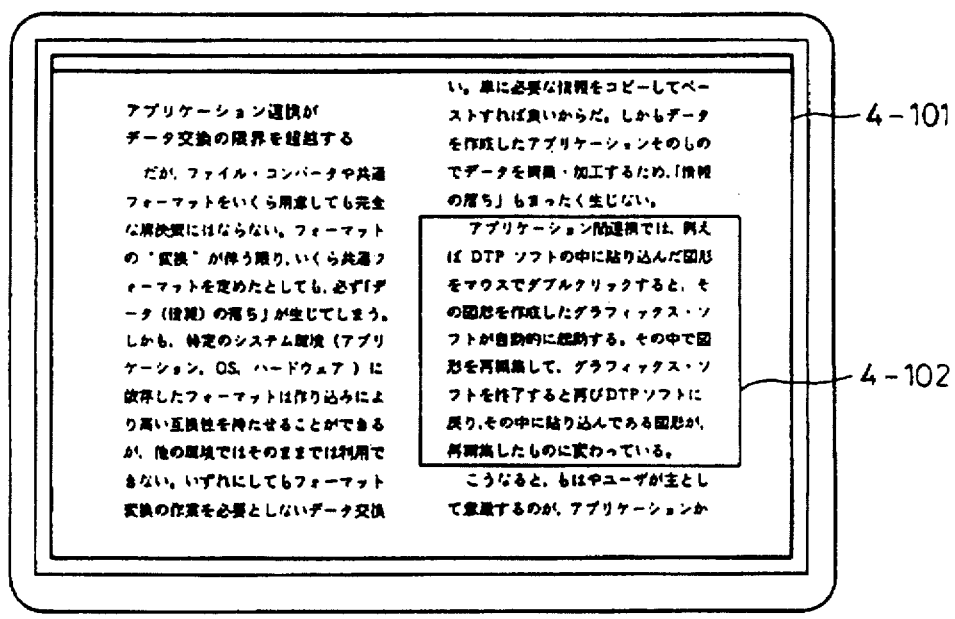
FIG. 41 is a diagram showing a first example of display for illustrating a conventional approach in the third embodiment.

According to the above-described processing, a display having an appropriate relationship between the size of the result window and the amount of displayed characters as the result of the character recognition can be obtained, as shown in FIG. 25. In FIG. 25, reference numeral 3-11 represents the image window, reference numeral 3-13 represents the result window, and reference numeral 3-14 represents a mode-setting window for setting various kinds of modes necessary for the operation of the OCR. Characters displayed on the result window 3-13 are obtained from the character image contained in the recognition area 4-102 assigned from the image displayed on the image window 4-101 shown in FIG. 41.

Although in the foregoing explanation, processing for a laterally-written document has been illustrated, the same processing may, of course, be applied to a vertically-written document.

Figure 26:
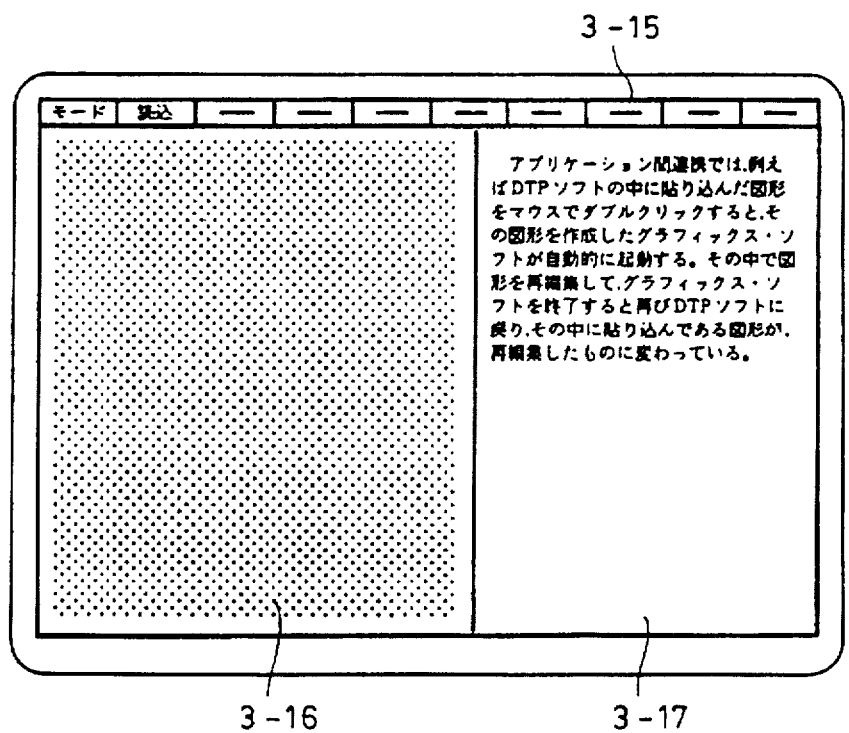
FIG. 26 is a diagram illustrating an example of a tile-type multiwindow.
Figures 28, 29:
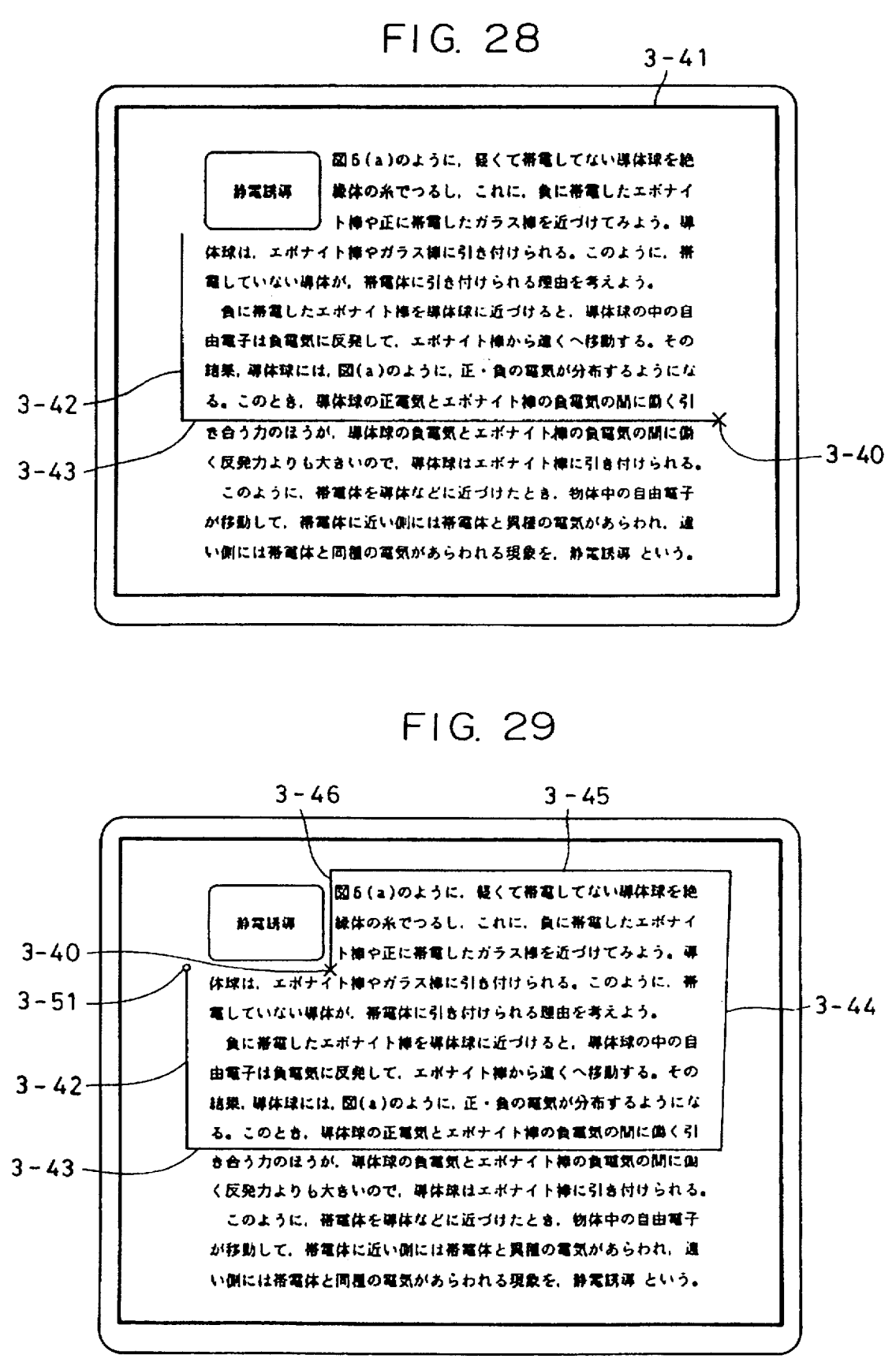

Also, although in the foregoing explanation, the multwindow picture surface comprises an overlap-type multiwindow in which respective windows overlap with one another, a tile-type multiwindow in which windows do not overlap may, of course, be used, as shown in FIG. 28. In FIG. 26, reference numeral 3-15 represents a window for setting various kinds of processing modes, reference numeral 3-16 represents an image window, and reference numeral 3-17 represents a result window. In FIG. 26, the height of the result window is fixed, while its width is determined in accordance with the maximum number of characters within the recognition area.

Operations, such as movement, resizing (magnification, reduction or the like), placement in front of another window, placement behind another window, and the like, may, of course, be freely performed for each window by operating the mouse.

According to the present embodiment, since the size of the result window is determined in accordance with the maximum number of characters and the number of lines contained in the assigned recognition area, it is possible to obtain a result window which is appropriate for the amount of displayed characters as the result of character recognition, and therefore to perform appropriate display which provides no difficulty in seeing the displayed sentence.

Area Assignment by a Closed Area Comprising a Plurality of Line Segments

Figure 27:
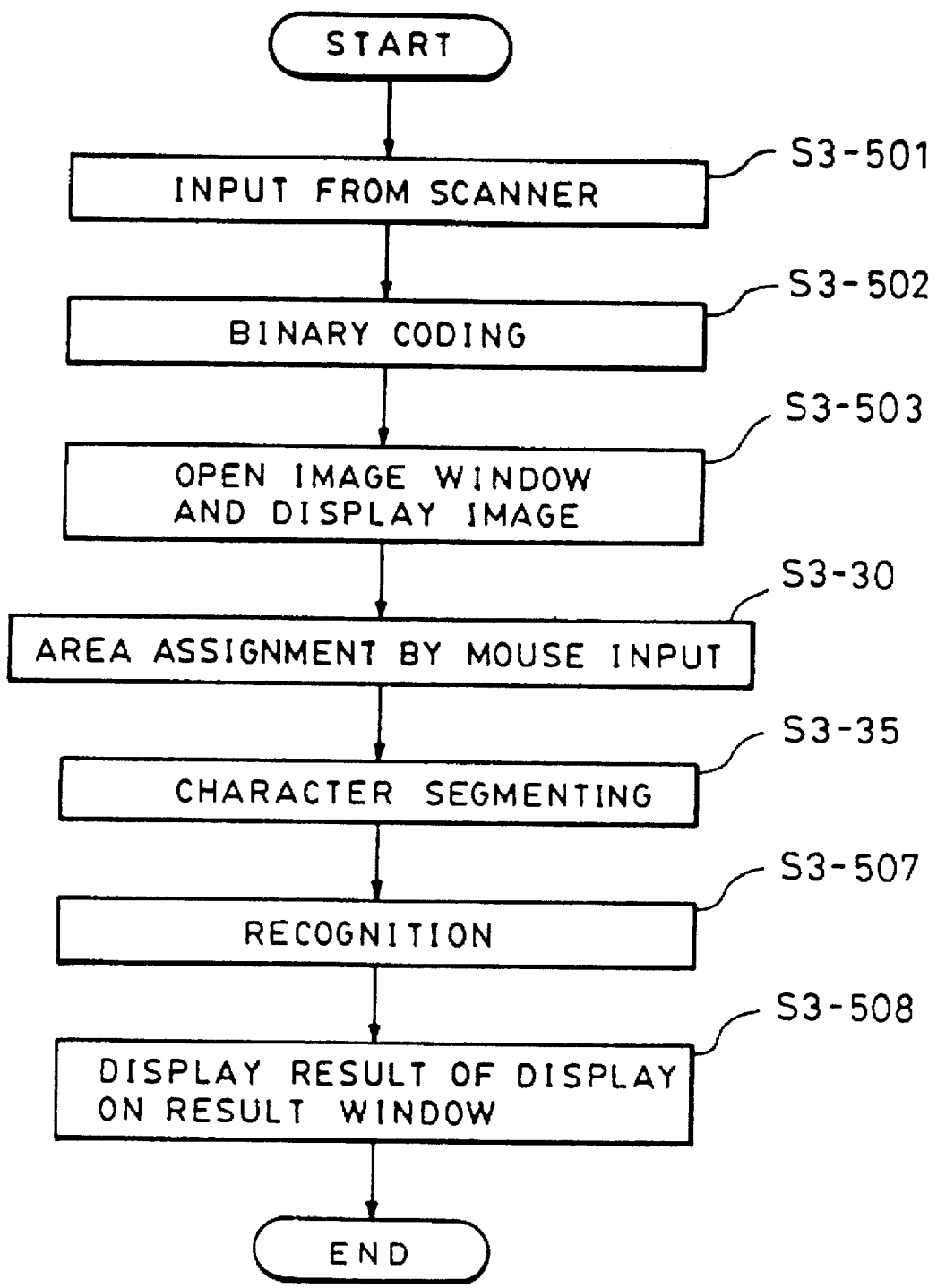
FIG. 27 is a flowchart of processing of assigning an area by a wall area comprising a plurality of line segments in the second embodiment.

An explanation has been provided for processing of determining an appropriate size of the result window in accordance with the maximum number of characters and the number of lines contained in the assigned recognition area. Next, an explanation will be provided of processing in which a recognition area having a complicated form other than an rectangle can be assigned with reference to the flowchart shown in FIG. 27. In FIG. 27, the same processing steps as those already explained in the conventional approach are indicated by the same step reference numerals, and an explanation thereof will be omitted.

In steps S3-501–S3-503, input of an image-bearing original, binary-coding processing and image display are performed according to the conventional technique.

Subsequently, in step S3-30, the recognition area is assigned using the mouse 3-3. In the present embodiment, line segments are drawn on the image-window picture frame by operating the mouse 3-3, a polygon is formed by connecting the line segments, and an area surrounded by the polygon is considered to be the recognition area. The operations of assigning the recognition area will be specifically explained with reference to display picture surfaces illustrated in FIGS. 28–30.

FIG. 28 is a diagram showing a state in which the image-bearing original input from the scanner 1 is displayed on the image window 3-41 after the completion of the processing of step S3-503. In FIG. 28, line segments 3-42 and 3-43 are already written, indicating that a polygon for assigning the recognition area is in the course of being drawn. The assignment of line segments is performed through the mouse 3-3. By performing a single clicking operation of the button of the mouse 3-3 after moving a cursor 3-40 to a desired position, the start point or the end point of a line segment costituting the polygon is determined.

FIG. 29 shows a state in which the drawing operation of the polygon is further advanced from the state shown in FIG. 28, and the final line segment is to be determined. In FIG. 29, line segments 3-44, 3-45 and 3-48 have been drawn by continuing respective single clicking operations of the button of the mouse 3-3 while moving the cursor 3-40 to desired positions. In order to complete the polygon, the button of the mouse 3-3 is clicked twice (double clicking) after moving the cursor 3-40 to the desired position. According to this operation, for example, in the case of FIG. 29, the position of the cursor 3-40 is connected to the start point 3-51 where the formation of the polygon has been started with a straight line to complete the polygon 3-61 shown in FIG. 30. This polygon 3-61 is considered as the recognition area.

After thus completing the assignment of the recognition area, the process proceeds to step S3-35, where character segmenting processing within the assigned area is executed, and rectangular areas for respective characters are taken out. This processing will be more specifically explained with reference to FIGS. 31 and 32. Although many methods of segmenting characters have already been known, character segmenting processing is performed using a histogram of black picture elements obtained by projection in the present embodiment. Any other segmenting method, such as contour-line tracking or the like, may, of course, be used.

Figure 31:
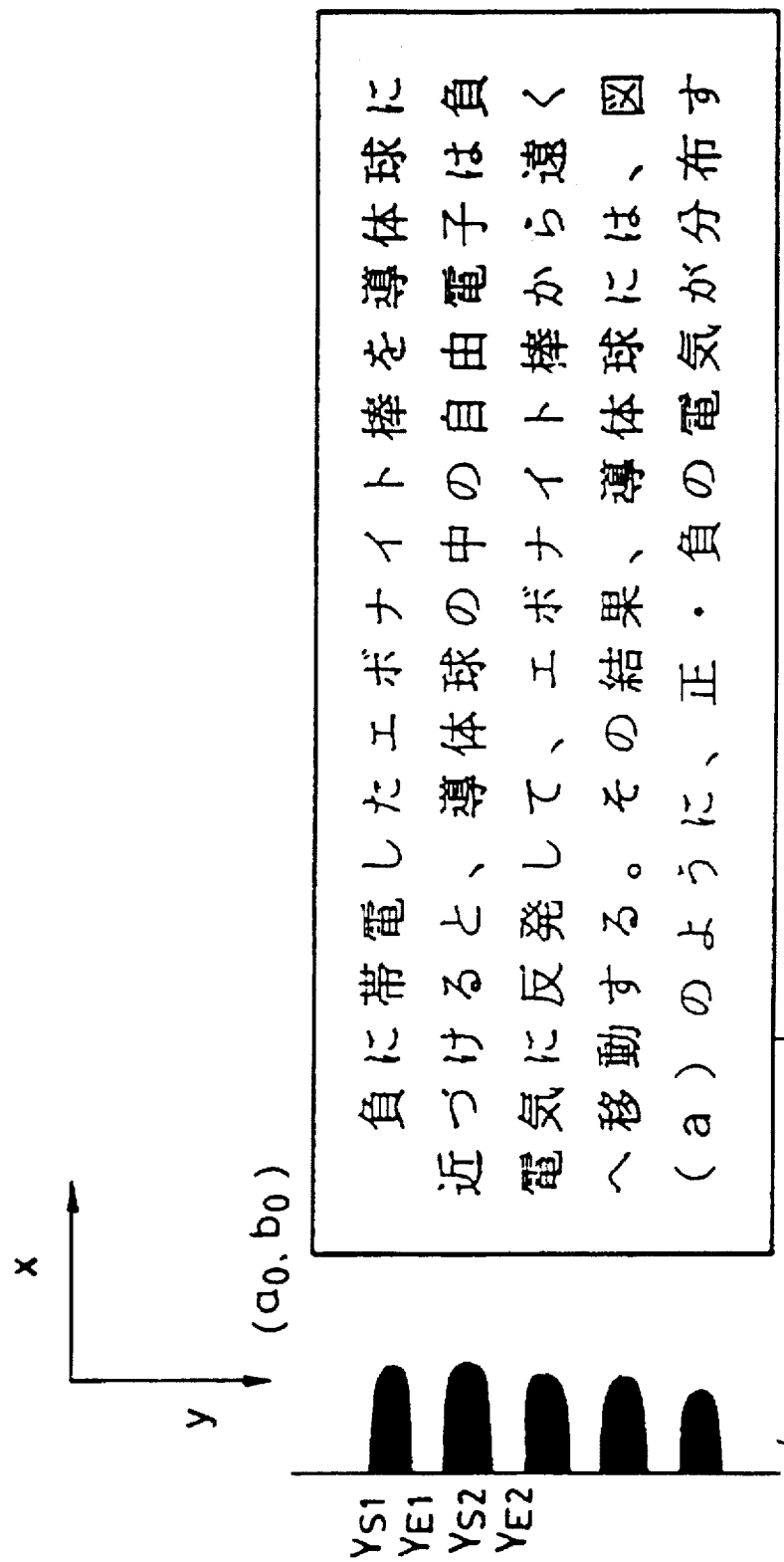
FIG. 31 is a diagram illustrating a line segmenting operation.

For the purpose of simplifying the explanation, it is assumed that the assigned recognition area is a rectangular area 3-71 shown in FIG. 31. If an x-y coordinate system comprising the x-axis in the lateral direction and the y-axis in the vertical direction as shown in FIG. 31 is considered, coordinates within this rectangular area can be expressed by $a_0<x<a_1$, and $b_0<y<b_1$.

If black picture elements are first projected in the x-direction within the rectangle 3-71, a histogram 3-72 in the direction of the y-axis is obtained. The values of the y-coordinates of the start points and the end points of respective lines are calculated as $Y_{S1}$, $Y_{E1}$, $Y_{S2}$, $Y_{E2}$, ... according to the histogram 3-72.

Figure 32:
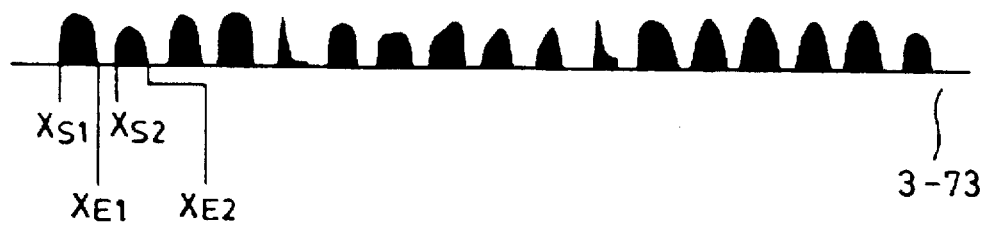
FIG. 32 is a diagram illustrating a character segmenting operation.

Subsequently, if black picture elements are projected in the y-direction for each line, that is, within a rectangle defined by $a_0<x<a$, and $Y_{Sn}<y<Y_{En}$ for the n-th line, as shown in FIG. 32, a histogram 73 in the direction of the x-direction is obtained. The x-coordinates of the start points and the end points of the respective characters are calculated as $X_{S1}$, $X_{E1}$, $X_{S2}$, $X_{E2}$, ... according to the histogram 3-73.

Figure 33:
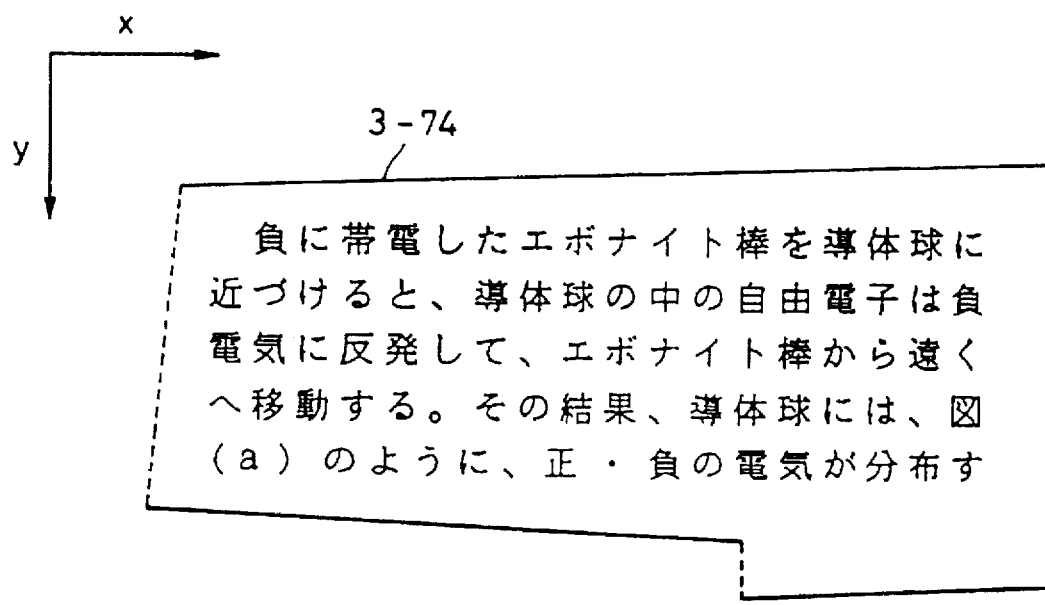
FIG. 33 is a diagram illustrating a line and character segmenting operation in area assignment by a polygon.

The above-described approach can also be applied to the recognition area having the shape of a polygon shown in FIG. 33. In the case of the polygon 3-74 shown in FIG. 33, the coordinates of an area surrounded by the polygon are expressed by:

$$X_S(y)<x<X_E(y) \quad (1)$$

and $$Y_S(x)<y<Y_E(x) \quad (2).$$

Accordingly, if projection in the x-direction and the y-direction is performed only within a range satisfying the conditions of expressions (1) and (2), segmenting of lines and characters in a desired area can be realized.

Finally, in steps S3-507 and S3-508, recognition processing for the segmented character image is performed according to the conventional technique, and the result of the recognition is displayed on the result window.

As described above, according to the present embodiment, since a polygon obtained by freely combining a plurality of line segments becomes the recognition area, it is possible to assign a recognition area having a complicated outer shape which cannot be assigned by a mouse in a simple manner. According to such an approach, even if a photograph, a drawing, a heading or the like is present, it is possible to select a recognition area with easily removing the unnecessary photograph or the like.

Although in the foregoing explanation, a mouse is used as the pointing device, any other kind of pointing device may also be used. Although an explanation has been provided of a case in which a single clicking operation and a double clicking operation of a mouse button is used for defining a line segment and a polygon, respectively, when the polygon is formed, these clicking operations may be changed, or a line segment or a polygon may be defined when the mouse button is released.

Area Assignment by a Plurality of Rectangles

An explanation has been provided of a case in which a polygon is formed by combining a plurality of line segments and making an area surrounded by the polygon to be a recognition area. Next, an explanation will be provided of a case in which a recognition area is formed by combining simple rectangles. Compared with the case in the foregoing explanation, the present approach has a feature in the procedure of forming a recognition area. Since other processing is common both in the foregoing approach and the present approach, only the procedure of forming a recognition area will be explained with reference to FIGS. 34–36.

Figure 34:
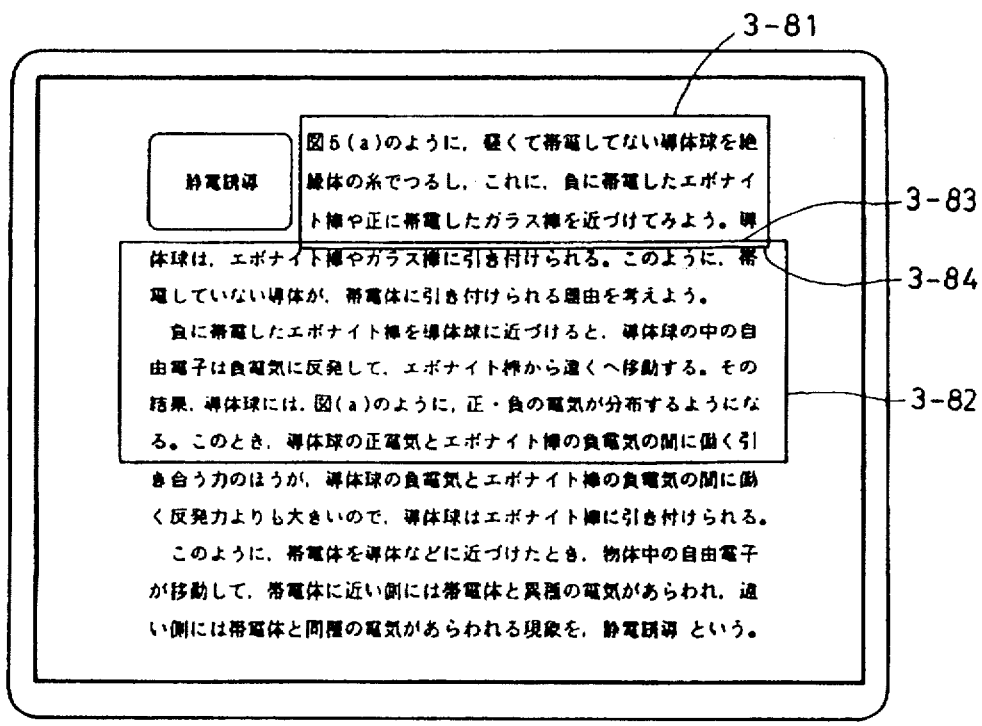
FIG. 34 is a first diagram illustrating area assignment by a plurality of rectangles.
Figure 35:
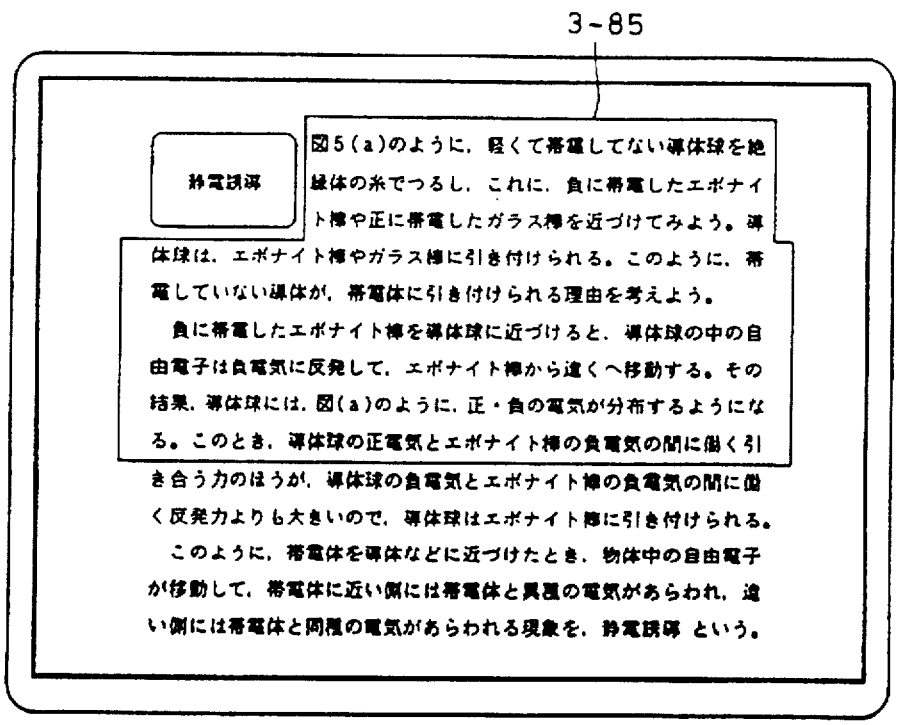
FIG. 35 is a second diagram illustrating area assignment by the plurality of rectangles.
Figure 36:
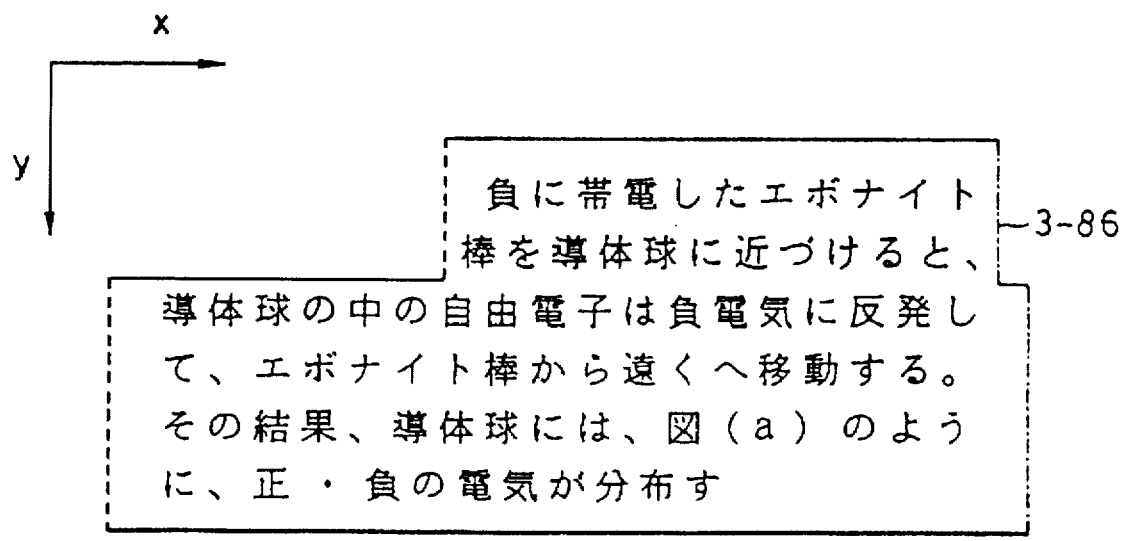
FIG. 36 is a diagram illustrating a line and character segmenting operation in an area assigned by the plurality of rectangles.
Figure 37:
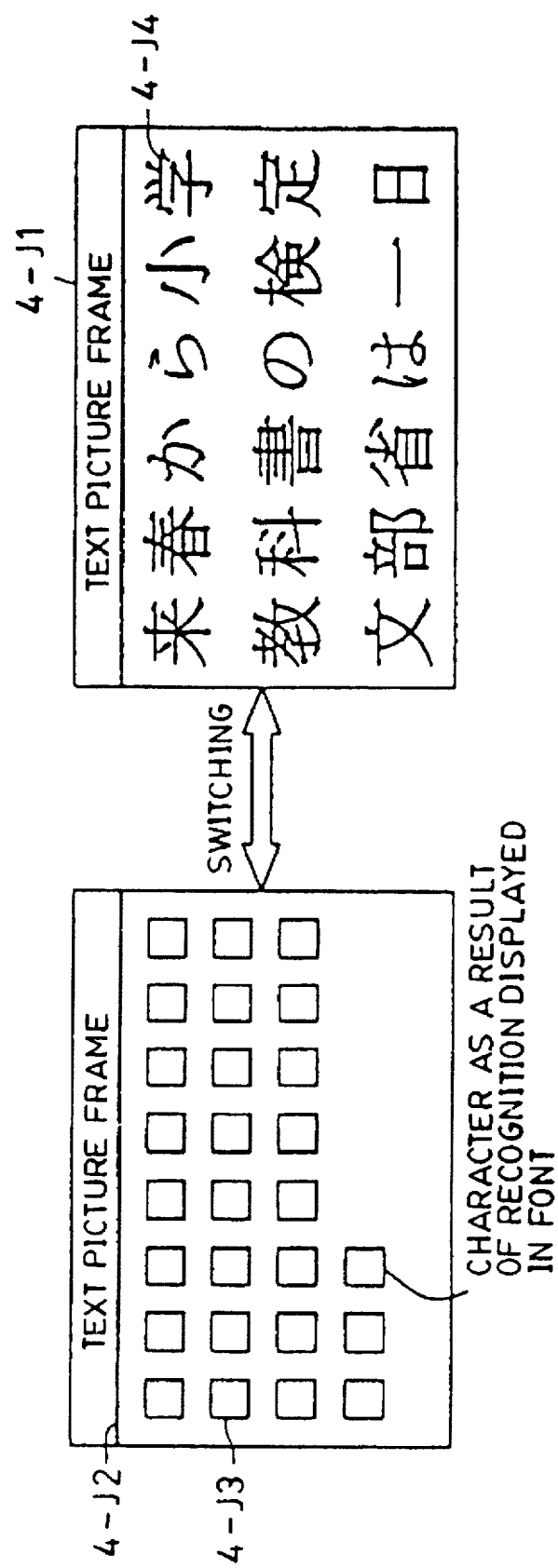
FIG. 37 is a diagram showing a first example of display for illustrating a conventional approach in the second embodiment.
Figure 38:
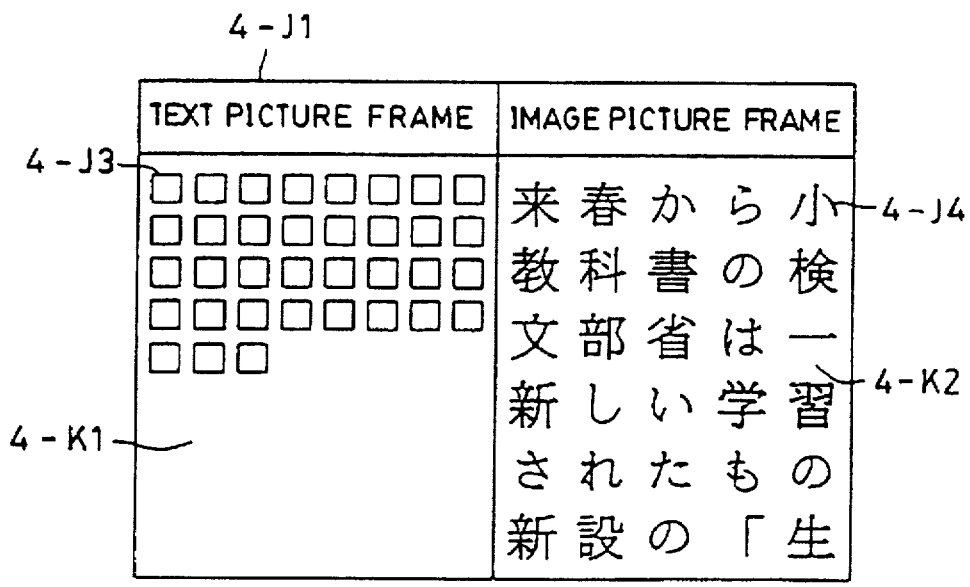
FIG. 38 is a diagram showing a second example of display for illustrating a conventional approach in the second embodiment.
Figure 39:
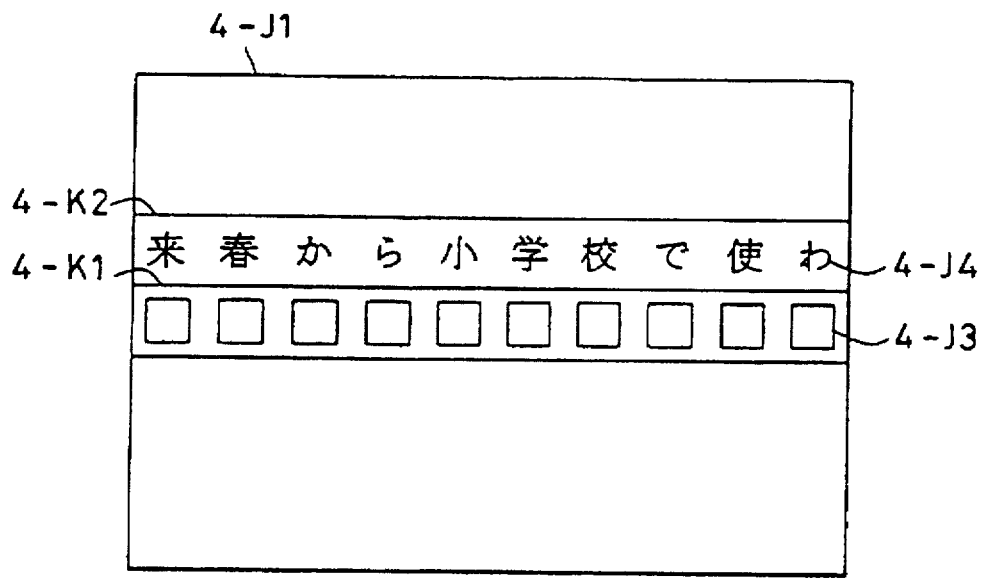
FIG. 39 is a diagram showing a third example of display for illustrating a conventional approach in the second embodiment.
Figure 42:
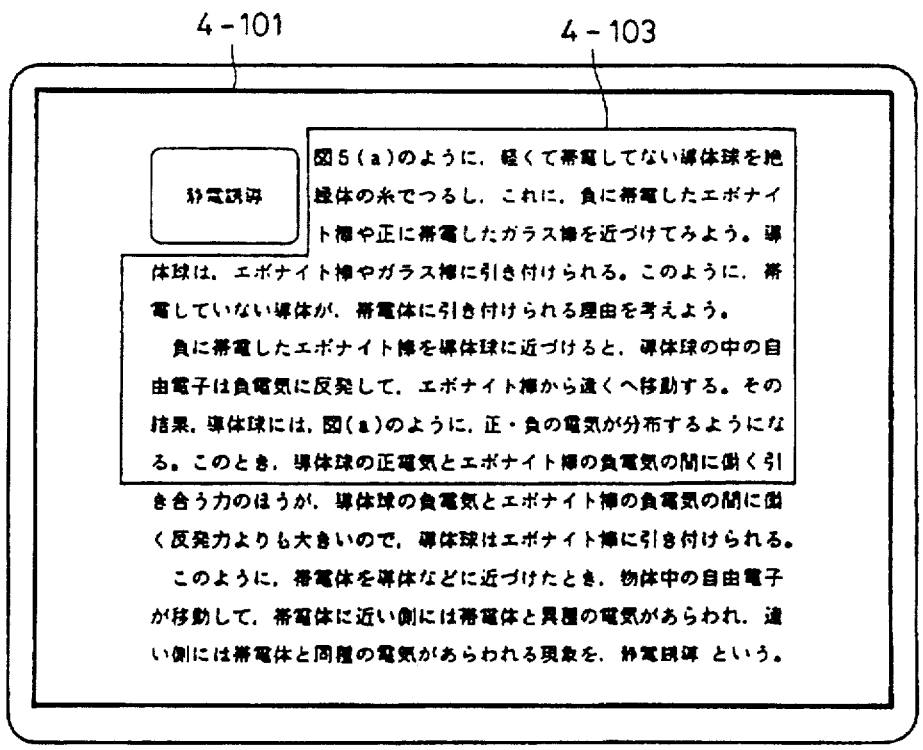
FIG. 42 is a diagram showing a second example of display for illustrating a conventional approach in the third embodiment.
Figure 43:
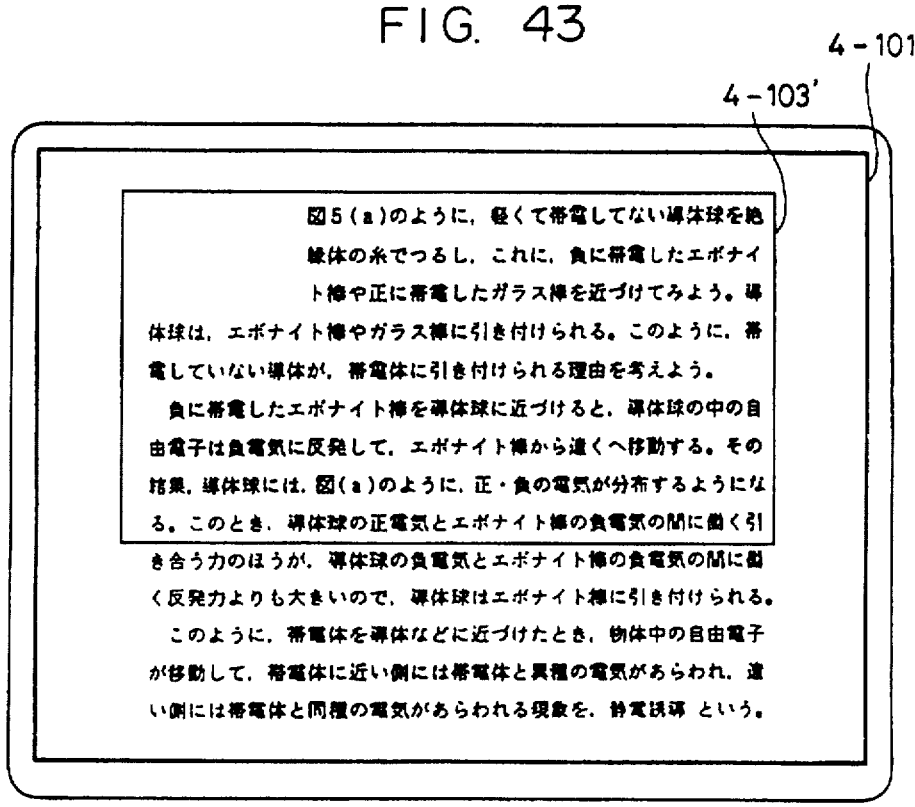
FIG. 43 is a diagram showing a third example of display for illustrating a conventional approach in the third embodiment.
Figure 44:
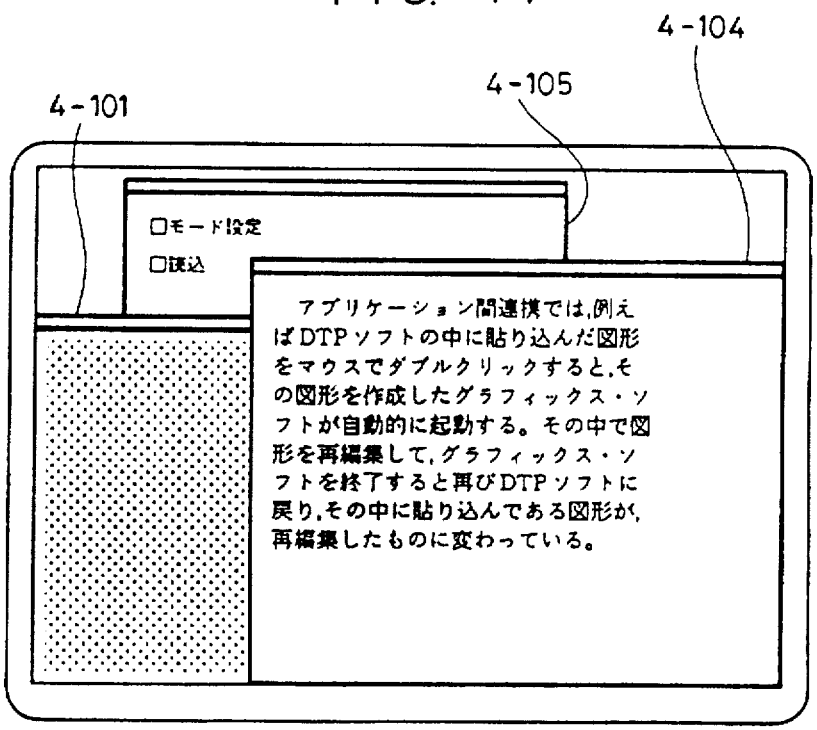
FIG. 44 is a diagram showing a first example of displaying a result for illustrating a conventional approach in the third embodiment.
Figure 45:
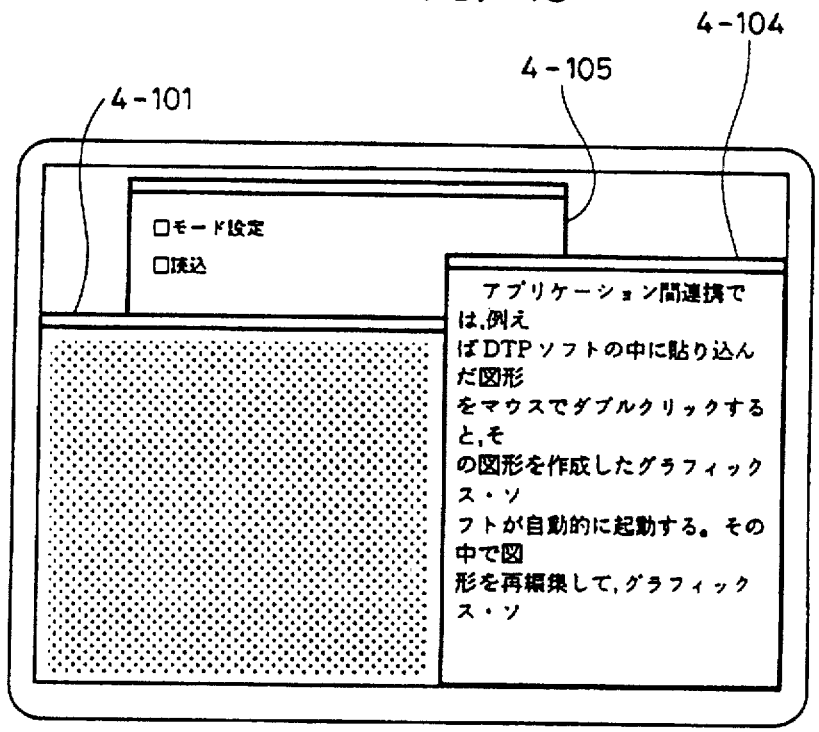
FIG. 45 is a diagram showing a second example of displaying a result for illustrating a conventional approach in the third embodiment.
Figure 46:
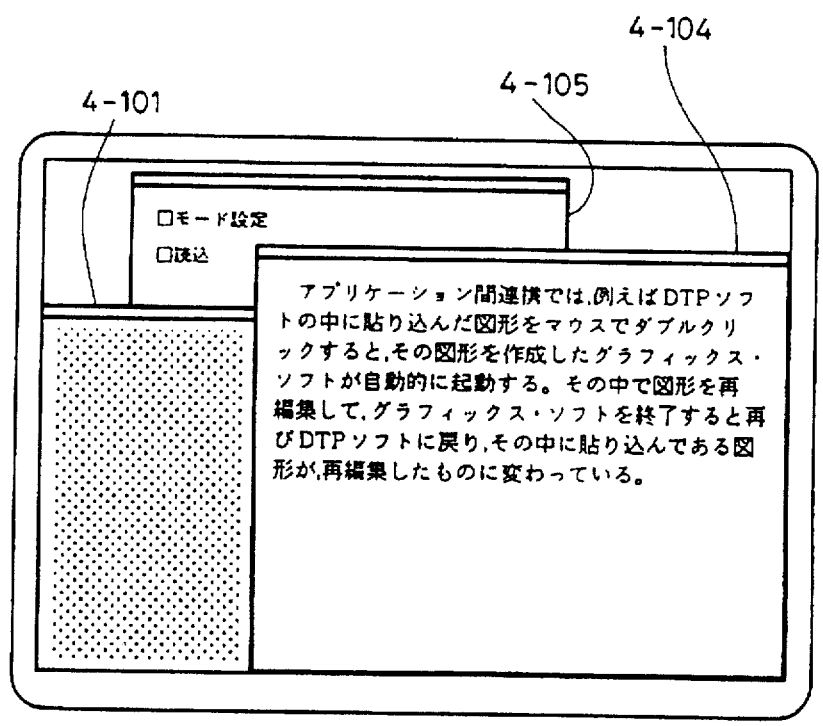
FIG. 46 is a diagram showing a third example of displaying a result for illustrating a conventional approach in the third embodiment.

The area 4-103 shown in FIG. 42 explained in the conventional approach is considered as the area to be recognized. First, a rectangular area 3-81 shown in FIG. 34 is assigned by the mouse 3-3. The rectangular area 3-81 is defined by first clicking the mouse button while adjusting the mouse cursor to the upper left end of the rectangular area 3-81, and clicking again the mouse button after moving the mouse to the lower right end of the rectangular area 3-81. Subsequently, a rectangular area 3-82 is assigned by operating the mouse 3-3 in the same manner as described above. In the present approach, a polygon is formed by continuously assigning a plurality of rectangular areas by the mouse and synthesizing the assigned rectangular areas. For example, in the case of FIG. 34, line segments 3-83 and 3-84 at a portion where the rectangular areas 3-81 and 3-82 overlap are neglected. As a result, a polygon 3-85 shown in FIG. 35 is considered to be the recognition area. Thus, a recognition area 86 shown in FIG. 36 is finally obtained.

In other words, the synthesis of rectangular areas resides in leaving only the outermost portions of line segments constituting assigned rectangles. Such synthesis processing is performed every time a rectangular area having an overlapped portion is assigned, and only the outermost line segments always remain as border lines of the recognition area.

According to the above-described approach, it is possible to assign a plurality of rectangular areas using a mouse, and to make a polygon formed by synthesizing the assigned rectangular areas to be the recognition area.

The present invention may be applied to a system comprising a plurality of apparatuses, or to an apparatus comprising a single unit. The present invention may, of course, be applied to a case in which the object of the invention is achieved by supplying a system or an apparatus with programs.

What is claimed is:

1. A character recognition method comprising the steps of:

inputting an image of a document;

displaying the input image;

segmenting character patterns from the input image information;

calculating the number of character patterns contained in a specified portion of the image marked by a cursor on a display picture which displays said input image based on the result of segmenting;

determining the size of a display area required for displaying a result of character recognition of the specified portion of the image according to the calculated number; and performing a display control so as to change the size of an area required for displaying a result of character recognition of the specified portion of the image in accordance with a size determined in said determining step.

2. A character recognition method according to claim 1, wherein said image information is input by a scanner.

3. A character recognition method according to claim 1, wherein said calculating step includes calculating the number of characters by segmenting the input image information at every character and adding the number of segmented characters.

4. A character recognition method according to claim 1, further comprising the step of displaying both the input image information and the character pattern which is the recognition result of the input image information stored in the area with the determined size.

5. A character recognition apparatus comprising:

input means for inputting an image of a document;

display means for displaying the input image;

segmenting means for segmenting character patterns from the input image information;

calculating means for calculating the number of character patterns contained in a specified portion of the image marked by a cursor on a display picture which displays said input image based on the result of segmenting;

picture-frame-size determination means for determining the size of a display area required for displaying a result of character recognition of the specified portion of the image information according to the calculated number; and control means for controlling a display so as to change the size of an area required for displaying a result of character recognition of the specified portion of the image information in accordance with a size determined by said picture-frame-size determination means.

6. An image processing method comprising the steps of:

segmenting character images from a document image;

storing character positions corresponding to the segmented character images;

displaying the document image and text comprised of character patterns obtained by recognizing the segmented character images;

designating a position of a desired character pattern based on the text displayed in said displaying step;

identifying a character image corresponding to the desired character pattern using the stored character positions; and performing a display control so as to change the display of the document image such that said identified character image is displayed so as to be discriminated from the other character images.

7. An image processing method according to claim 6, wherein said storing step includes storing positions of output dots of the segmented character images.

8. An image processing apparatus comprising:

segmenting means for segmenting character images from a document image;

storage means for storing character positions corresponding to the segmented character images;

display means for displaying the document image and text comprised of character patterns obtained by recognizing the segmented character images;

designating means for designating a position of a desired character pattern based on the text displayed by said display means; and identifying means for identifying a character image corresponding to the desired character pattern using the stored character positions; and control means for performing a display control so as to change the display of the document image such that said identified character image is displayed so as to be discriminated from the other character images.

9. An image processing apparatus according to claim 8, wherein said storage means stores positions of output dots of the segmented character images.

* * * * *

UNITED STATES PATENT AND TRADEMARK OFFICE
CERTIFICATE OF CORRECTION

PATENT NO. : 5,703,962

DATED : December 30, 1997

INVENTORS : Toru Niki, et al.

It is certified that error appears in the above-identified patent and that said Letters Patent is hereby corrected as shown below:

COVER PAGE

Under [75] Inventor, "Nasami Kugai" should read
--Masami Kugai--.

COLUMN 3

Line 12, "numeral 4-103" should read --numeral 4-103'--; and
Line 28, "numeral 4-108" should read --numeral 4-105--.

COLUMN 6

Line 45, "unit 8" should read --unit 6--.

COLUMN 7

Line 36, "character" should read --character "ʌ"--; and
Line 37, ""can" should read --can--.

UNITED STATES PATENT AND TRADEMARK OFFICE
CERTIFICATE OF CORRECTION

PATENT NO. : 5,703,962
DATED : December 30, 1997
INVENTORS : Toru Niki, et al.

It is certified that error appears in the above-identified patent and that said Letters Patent is hereby corrected as shown below:

COLUMN 12

Line 49, "FIG. 28." should read --FIG. 26.--.

COLUMN 13

Line 43, "3-48" should read --3-46--.

Signed and Sealed this

Nineteenth Day of January, 1999

Attest:

Attesting Officer

*Acting Commissioner of Patents and Trademarks*